US011394892B2

(12) United States Patent
Lee et al.

(10) Patent No.: US 11,394,892 B2
(45) Date of Patent: Jul. 19, 2022

(54) ELECTRONIC DEVICE, AND METHOD FOR ELECTRONIC DEVICE COMPRESSING HIGH DYNAMIC RANGE IMAGE DATA

(71) Applicant: Samsung Electronics Co., Ltd., Gyeonggi-do (KR)

(72) Inventors: A-Rang Lee, Gyeonggi-do (KR); Hyung-Ju Chun, Gyeonggi-do (KR); Jong-Bum Choi, Gyeonggi-do (KR); Sung-Oh Kim, Gyeonggi-do (KR); Young-Jo Kim, Gyeonggi-do (KR); Hyun-Hee Park, Seoul (KR); Ha-Joong Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 164 days.

(21) Appl. No.: 16/631,494

(22) PCT Filed: Jul. 19, 2018

(86) PCT No.: PCT/KR2018/008141
§ 371 (c)(1),
(2) Date: Jan. 16, 2020

(87) PCT Pub. No.: WO2019/017698
PCT Pub. Date: Jan. 24, 2019

(65) Prior Publication Data
US 2020/0137290 A1 Apr. 30, 2020

(30) Foreign Application Priority Data
Jul. 20, 2017 (KR) .................... 10-2017-0092179

(51) Int. Cl.
*H04N 5/235* (2006.01)
*H04N 19/46* (2014.01)
*H04N 19/93* (2014.01)

(52) U.S. Cl.
CPC .......... *H04N 5/2355* (2013.01); *H04N 19/46* (2014.11); *H04N 19/93* (2014.11)

(58) Field of Classification Search
None
See application file for complete search history.

(56) References Cited

U.S. PATENT DOCUMENTS 9,918,095 B1\* 3/2018 Ström .................... H04N 19/86
2003/0012278 A1\* 1/2003 Banerji ................ H04N 19/517
375/240.12

(Continued)

FOREIGN PATENT DOCUMENTS

| KR | 10-0480785 B1 | 4/2005 |
|---|---|---|
| KR | 10-2011-0013072 A | 2/2011 |
| KR | 10-2015-0099302 A | 8/2015 |

OTHER PUBLICATIONS

Decision on Grant dated Apr. 18, 2022.

*Primary Examiner* — Talha M Nawaz
(74) *Attorney, Agent, or Firm* — Cha & Reiter, LLC

(57) ABSTRACT

Various embodiments of the present invention relate to an electronic device comprising: a processor; an image sensor that includes a first sensor pixel set and a second sensor pixel set; and a control circuit that is electrically connected to the image sensor, wherein the control circuit can be configured so as to obtain raw image data by using the image sensor in which the exposure of the first sensor pixel set and the exposure of the second sensor pixel set are configured differently, divide the raw image data into first channel data corresponding to a first color and second channel data corresponding to a second color, generate first channel compression data that are compressed on the basis of the first channel data such that at least a part of data obtained using the first sensor pixel set adjoins and at least a part of data obtained using the second sensor pixel set adjoins, generate (Continued)

second channel compression data that are compressed on the basis of the second channel data such that at least a part of the data obtained using the first sensor pixel set adjoins and at least a part of the data obtained using the second sensor pixel set adjoins, and transmit the compressed first channel compression data and the compressed second channel compression data to the processor. In addition, among the various embodiments of the present invention other embodiments may be possible.

20 Claims, 26 Drawing Sheets

(56) References Cited

U.S. PATENT DOCUMENTS

| | | | |
|---|---|---|---|
| 2004/0135908 A1* | 7/2004 | Pappalardo | H04N 1/648 348/272 |
| 2008/0291289 A1* | 11/2008 | Kurane | H04N 5/235 348/222.1 |
| 2011/0025869 A1 | 2/2011 | Lee | |
| 2011/0033127 A1* | 2/2011 | Rasmusson | G06T 9/00 382/238 |
| 2012/0189215 A1 | 7/2012 | Deshpande | |
| 2012/0229636 A1* | 9/2012 | Ogawa | H04N 19/182 348/143 |
| 2015/0042836 A1* | 2/2015 | Lin | H04N 5/355 348/222.1 |
| 2015/0207974 A1 | 7/2015 | Mody et al. | |
| 2015/0244916 A1* | 8/2015 | Kang | H04N 5/2353 348/222.1 |
| 2015/0382006 A1 | 12/2015 | Ikeda et al. | |
| 2016/0234514 A1 | 8/2016 | Ju et al. | |
| 2016/0330468 A1* | 11/2016 | Min | H04N 19/184 |
| 2016/0371822 A1* | 12/2016 | Le Pendu | C10G 5/00 |
| 2022/0070439 A1* | 3/2022 | Laroche | H04N 19/91 |

* cited by examiner

ELECTRONIC DEVICE, AND METHOD FOR ELECTRONIC DEVICE COMPRESSING HIGH DYNAMIC RANGE IMAGE DATA

CROSS-REFERENCE TO RELATED APPLICATION(S)

This application is a National Phase Entry of PCT International Application No. PCT/KR2018/008141, which was filed on Jul. 19, 2018, and claims a priority to Korean Patent Application No. 10-2017-0092179, which was filed on Jul. 20, 2017, the contents of which are incorporated herein by reference.

TECHNICAL FIELD

1. Field

Various embodiments relate to electronic devices of compressing or transmitting high dynamic range (HDR) image data obtained from an image sensor and methods of compressing or transmitting high dynamic range image data by an electronic device.

2. Description of the Related Art

Image processing electronic devices are able to obtain raw image data through image sensors and process the obtained raw image data via use of an image signal processor (ISP).

The image signal processors may process the received raw image data using image quality enhancer algorithms and may thus provide a quality-enhanced image.

Dynamic range of an image may refer to a range in which brightness may be represented from a dark portion of the image to a bright portion and be defined as a ratio of the value of the brightest pixel to the value of the darkest pixel. A dynamic range adjusting process is performed by adjusting the pixel value indicating brightness, e.g., the brightness of the image. Technology of enhancing image quality by getting better the dynamic range of images is referred to as a high dynamic range scheme.

The HDR scheme comes in various types, e.g., such as expanding the dynamic range by obtaining images with different exposures by capturing the same object two or more times and then synthesizing the images and expanding the dynamic range by setting different exposure on the pixels constituting the image sensor and sensing images.

SUMMARY

Raw image data obtained via an image sensor may be transferred to a processor, e.g., an image signal processor. The raw image data is non-compressed, high-resolution or high-volume data and, to transmit such raw image data at a high frame rate, a communication interface is needed which has a relatively high-unit (e.g., Gbps) transmission bandwidth.

To transmit high-resolution or high-volume raw image data to the processor, a high-performance interface is required, which may raise hardware costs and consume more power and more memory capacity.

Since an HDR image has a different exposure per pixel, data compression performed to transmit the HDR image to the processor may suffer from lowered compression efficiency due to significant level differences between the adjacent pixels.

According to various embodiments, there may be provided an electronic device and a method of compressing or transmitting high dynamic range image data by an electronic device, which may address the foregoing issues by effectively compressing and transferring HDR image data to the processor.

To achieve the foregoing or other objects, according to an embodiment, an electronic device comprises a processor, an image sensor including a first sensor pixel set and a second sensor pixel set, and a control circuit electrically connected with the image sensor, wherein the control circuit is configured to obtain raw image data using the image sensor having different exposure settings for the first sensor pixel set and the second sensor pixel set, split the raw image data into first channel data corresponding to a first color and second channel data corresponding to a second color, generate first channel compression data compressed so that at least portions of data obtained via the first sensor pixel set are adjacent to each other and at least portions of data obtained via the second sensor pixel set are adjacent to each other based on the first channel data, generate second channel compression data compressed so that at least portions of data obtained via the first sensor pixel set are adjacent to each other and at least portions of data obtained via the second sensor pixel set are adjacent to each other based on the second channel data, and transmit the compressed first channel compression data and the compressed second channel compression data to the processor.

According to an embodiment, a method for transmitting high dynamic range (HDR) image data comprises obtaining, by an image sensor including a first sensor pixel set and a second sensor pixel set, raw image data using the image sensor having different exposure settings for the first sensor pixel set and the second sensor pixel set, splitting the raw image data into first channel data corresponding to a first color and second channel data corresponding to a second color, generating first channel compression data by performing compression so that at least portions of data obtained via the first sensor pixel set are adjacent to each other and at least portions of data obtained via the second sensor pixel set are adjacent to each other based on the first channel data, generating second channel compression data by performing compression so that at least portions of data obtained via the first sensor pixel set are adjacent to each other and at least portions of data obtained via the second sensor pixel set are adjacent to each other based on the second channel data, and transmitting the compressed first channel compression data and the compressed second channel compression data to a processor.

According to various embodiments, an electronic device and a method for transmitting high dynamic range image data by the electronic device may effectively compress HDR image data and transfer the compressed HDR image data, thereby addressing the foregoing or other problems.

DETAILED DESCRIPTION

Figure 1:
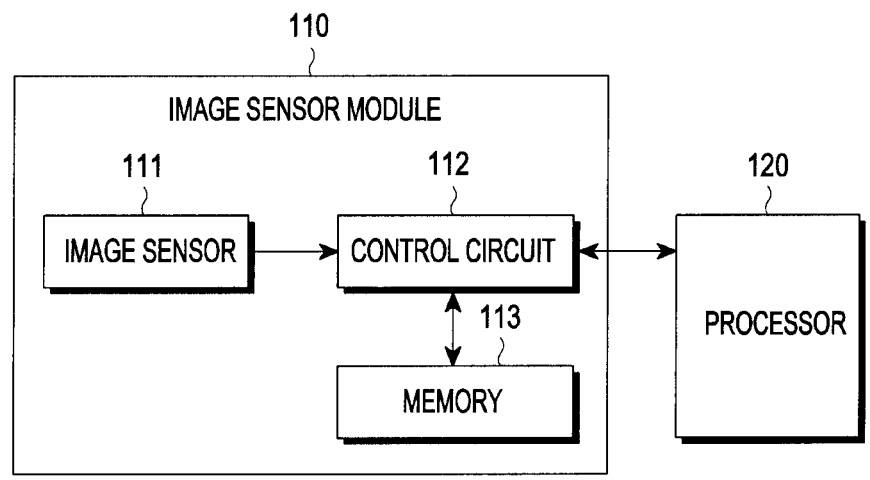
FIG. 1 is a view illustrating an example configuration of an electronic device capable of compressing and transmitting HDR image data according to an embodiment.

Hereinafter, embodiments of the present invention are described with reference to the accompanying drawings. However, it should be appreciated that the present disclosure is not limited to the embodiments, and all changes and/or equivalents or replacements thereto also belong to the scope of the present disclosure. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present invention may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device (e.g., smart glasses, a head-mounted device (HMD), electronic clothes, an electronic bracelet, an electronic necklace, an electronic appcessory, an electronic tattoo, a smart mirror, or a smart watch).

According to some embodiments, the electronic device may be a smart home appliance. For example, examples of the smart home appliance may include at least one of a television, a digital video disk (DVD) player, an audio player, a refrigerator, an air conditioner, a cleaner, an oven, a microwave oven, a washer, a dryer, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to another embodiment, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to some embodiments, examples of the electronic device may at least one of furniture, part of a building/structure, an electronic board, an electronic signature receiving device, a projector, or various measurement devices (e.g., devices for measuring water, electricity, gas, or electromagnetic waves). According to various embodiments, the electronic device may be one or a combination of the above-listed devices. According to an embodiment, the electronic device may be a flexible electronic device. The electronic device disclosed herein is not limited to the above-listed devices, and may include new electronic devices depending on the development of technology.

According to various embodiments, there is disclosed an electronic device capable of encoding HDR image data with a high compression efficiency and transferring the encoded HDR image data to a processor or an image signal processor and a method for transmitting the HDR image data by the electronic device.

In various embodiments described below, image data obtained from an image sensor is referred to as 'raw image data' for convenience. The raw image data is not limited to a particular format of data but rather denotes the broadest concept of data obtained from the image sensor before undergoing image processing into a particular format of data. For example, according to various embodiments, the raw image data may have various formats depending on the kind, size, and shape of the image sensor. For example, the raw image data may include data for a plurality of pixels constituting a frame corresponding to a whole image, and the pixel value of each pixel may be represented and processed in a plurality of bits.

In various embodiments described below, 'bit plane' may include at least one bit and, when the pixel value of a particular pixel constituting image data is represented as a bit value, each bit plane may correspond to each position (or place) in the bit value. For example, in a case where the pixel value of each pixel is represented as 10-bit data of the zeroth bit to the ninth bit (corresponding to the most significant bit (MSB)), per-bit position bit planes may be constructed based on the data corresponding to the same bit position in each pixel value for the plurality of pixels. For example, in a case where the pixel value is 10-bit data, the zeroth bit plane corresponding to the zeroth bit, the first bit plane corresponding to the first bit, . . . , and the ninth bit plane corresponding to the ninth bit may be constructed from the plurality of pixels.

In various embodiments described below, 'HDR image' denotes an image with different exposures (e.g., exposure amounts or exposure values) between the plurality of pixels constituting an image and is not limited to a particular pattern of, or a particular format of, an image. According to various embodiments, a method of generating the HDR image may obtain images with different exposures by capturing the same object two or more times and then synthesizing the images, thereby generating the HDR image. The method may also generate the HDR image by sensing images with a different exposure set on each of the pixels constituting the image sensor. Various embodiments are not limited to a particular method of HDR image generation.

Hereinafter, electronic devices are described with reference to the accompanying drawings, according to various embodiments. As used herein, the term "user" may denote a human or another device (e.g., an artificial intelligent electronic device) using the electronic device.

FIG. 1 is a block diagram illustrating an exemplary configuration of an electronic device according to an embodiment. Referring to FIG. 1, according to various embodiments, an electronic device may include an image sensor module 110 and a processor 120. The image sensor module 110 may be electrically or communicatively connected with the processor 120. The image sensor module 110 and the processor 120 may be included and configured in one electronic device or may be configured in separate electronic devices.

The image sensor module 110 may include at least one of an image sensor 111, a control circuit 112, and a memory 113. As shown in FIG. 1, the control circuit 112 or the memory 113 in the image sensor module 110 may be configured in the image sensor module 110 or may be configured in a separate module type or a separate module from the image sensor module 110. The image sensor module 110 may configure at least part of a camera module configured in the electronic device or may configure at least part of a camera as an electronic device.

According to various embodiments, the image sensor 111 may be a sensor capable of detecting incident light and sensing a brightness-related, or color-related, value per pixel and is not limited to a sensor specifically named. Rather, any type of sensor capable of determining a value related to brightness or color per pixel by incident light may be included in the image sensor according to an embodiment. Hereinafter, for ease of description, data obtained from the image sensor 111 is termed raw image data.

The control circuit 112 may be configured to compress or encode raw image data (e.g., HDR image data) obtained from the image sensor 111 according to various embodiments and to transmit the compressed or encoded image data to the processor 120. According to various embodiments, specific example methods of compressing and transmitting raw image data (e.g., HDR image data) by the control circuit 112 are described below.

The memory 113 may store at least one of the raw image data obtained by the image sensor 111, data generated during the data compression by the control circuit 112, compression data compressed via the control circuit 112, data generated while compressing the raw image data via the control circuit 112, or a bit stream including the compression data and transmitted to the processor 120. Although FIG. 1 illustrates that the memory 113 is included in the image sensor module 110 for convenience, the memory 113 may be configured in a separate position from the image sensor module 110 or in another external electronic device 300 connected via a wired/wireless communication network.

The image sensor module 110 and the processor 120 may be connected together via various wired/wireless communication interface. For example, according to various embodiments, the image sensor module 110 and the processor 120 may be connected together via a mobile industry processor interface (MIPI), and compressed data may be transmitted from the image sensor module 110 through the MIPI line to the processor 120. According to various embodiments, the image sensor module 110 may transmit or receive various control signals to/from the processor 120 via a serial peripheral interface (SPI).

Figure 2:
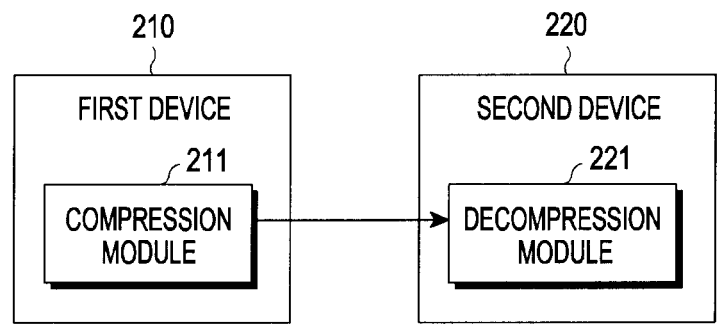
FIG. 2 is a view illustrating an example configuration of a network according to an embodiment.

FIG. 2 is a view illustrating an example configuration of a network according to an embodiment. Referring to FIG. 2, according to various embodiments, an electronic device may include a first device 210 and a second device 220. The first device 210 may include a compression module 211, and the second device 220 may include a decompression module 221.

The compression module 211 of the first device 210 may be configured to compress HDR image data according to various embodiments and may include at least part of the configuration of the control circuit 112 of FIG. 1. The data compressed in the first device 210 may be transmitted to the second device 220 via various types of wired/wireless interfaces.

The decompression module 221 of the second device 220 may decompress the compression data transmitted from the first device 210, corresponding to the compression scheme of the compression module 211.

The first device 210 and the second device 220 may be configured in modules in a single electronic device, or the first device 210 and the second device 220 may be configured separately in different electronic devices. According to various embodiments, the first device 210 may correspond to the image sensor module 110 of FIG. 1, and the second device 220 may correspond to the processor 120 of FIG. 1. For example, the compression module 211 included in the first device 210 may correspond to the control circuit 112 of FIG. 1, and the decompression module 221 included in the second device 220 may be included in the processor 120.

According to various embodiments, as used herein, the term "unit" or "module" may denote hardware and a functional or structural combination of software for driving the hardware to implement the technical spirit according to various embodiments. For example, it should be appreciated by one of ordinary skill in that art that each functional unit or module may be a logical unit of a predetermined code and a hardware resource for executing the code, and the functional unit does not necessarily mean a physically connected code or a type of hardware.

According to an embodiment, an electronic device comprises a processor and an image sensor module electrically connected with the processor. The image sensor module includes an image sensor for obtaining raw image data and a control circuit electrically connected with the processor. The control circuit may be configured to generate a plurality of first bit planes configured based on a bit position of each pixel value with at least some of a plurality of pixels constituting a first pixel set corresponding to a first exposure for the plurality of pixels corresponding to at least part of the raw image data obtained by the image sensor, generate a plurality of second bit planes configured based on a bit position of each pixel value with at least some of a plurality of pixels constituting a second pixel set corresponding to a second exposure different from the first exposure, encode each of the plurality of first bit planes and the plurality of second bit planes, and transmit a bit stream including the encoded first bit planes and second bit planes to the processor.

According to various embodiments, the control circuit may be configured to multiply a pixel value of each of the pixels constituting the second pixel set based on a ratio of the first exposure to the second exposure by a preset value and generate the second bit planes with at least some of the plurality of pixels constituting the second pixel set.

According to various embodiments, the control circuit may be configured to select at least one bit plane to perform encoding based on compression efficiency among the first bit planes and the second bit planes.

According to various embodiments, the control circuit may be configured to select the at least one bit plane based on at least one of a pixel value of each of the plurality of pixels, numbers of the first bit planes, numbers of the second bit planes, and flat area information for the raw image data.

According to various embodiments, each pixel of the first pixel set and each pixel of the second pixel set are arranged according to a preset pattern on the raw image.

According to various embodiments, the control circuit may be configured to split the raw image data obtained from the image sensor into a plurality of color channels and, as part of generating the first bit plane or generating the second bit plane, generate a plurality of bit planes corresponding to each color channel split into.

According to various embodiments, the control circuit may be configured to convert at least a portion of the raw image data obtained from the image sensor into a gray code and generate the first bit planes or the second bit planes for the raw image data converted into the gray code.

According to various embodiments, the control circuit may be configured to perform encoding on the plurality of first bit planes or the plurality of second bit planes based on a run-length scheme.

According to various embodiments, the control circuit may be configured to divide the raw image data into a plurality of partitions, each of the partitions including a plurality of pixels, and to generate the first bit planes or the second bit planes using data corresponding to the plurality of pixels included in each partition.

According to various embodiments, the control circuit may be configured to generate a bit stream including an image header data field including at least one piece of information related to the raw image data, a partition header data field including at least one piece of information related to the partition, or a compression data field including data resultant from encoding the bit planes, and wherein the control circuit is configured to transmit the bit stream to the processor to enable the processor to decode the encoded data using, at least, the image header data field including the at least one piece of information related to the raw image data, the partition header data field including the at least one piece of information related to the partition, or the compression data field including the data resultant from encoding the bit planes.

According to an embodiment, an electronic device comprises a processor, an image sensor including a first sensor pixel set and a second sensor pixel set, and a control circuit electrically connected with the image sensor, wherein the control circuit is configured to obtain raw image data using the image sensor having different exposure settings for the first sensor pixel set and the second sensor pixel set, split the raw image data into first channel data corresponding to a first color and second channel data corresponding to a second color, generate first channel compression data compressed so that at least portions of data obtained via the first sensor pixel set are adjacent to each other and at least portions of data obtained via the second sensor pixel set are adjacent to each other based on the first channel data, generate second channel compression data compressed so that at least portions of data obtained via the first sensor pixel set are adjacent to each other and at least portions of data obtained via the second sensor pixel set are adjacent to each other based on the second channel data, and transmit the compressed first channel compression data and the compressed second channel compression data to the processor.

According to various embodiments, the control circuit may be configured to generate a plurality of first bit planes configured with at least some of a plurality of pixels constituting the first sensor pixel set, based on a bit position of each pixel value, generate a plurality of second bit planes configured with at least some of a plurality of pixels constituting the second sensor pixel set, based on a bit position of each pixel value, and generate the first channel compression data or the second channel compression data by performing compression per first bit plane or per second bit plane.

According to various embodiments, the control circuit may be configured to multiply a pixel value of each of the plurality of pixels constituting the second sensor pixel set by a preset value based on a ratio of exposure of the first sensor pixel set to exposure of the second sensor pixel set and generate the second bit planes with at least some of the plurality of pixels constituting the second sensor pixel set.

According to various embodiments, the control circuit may be configured to select at least one bit plane to perform encoding based on compression efficiency among the first bit planes and the second bit planes.

According to various embodiments, the control circuit may be configured to select the at least one bit plane based on at least one of a pixel value of each of the plurality of pixels constituting the first sensor pixel set, a pixel value of each of the plurality of pixels constituting the second sensor pixel set, numbers of the first bit planes, numbers of the second bit planes, and flat area information for the raw image data.

According to various embodiments, each pixel of the first sensor pixel set and each pixel of the second sensor pixel set may be arranged according to a preset pattern on the raw image data.

According to various embodiments, the control circuit may be configured to convert at least a portion of the raw image data obtained from the image sensor into a gray code and generate the first bit planes or the second bit planes for the raw image data converted into the gray code.

According to various embodiments, the control circuit may be configured to generate the first channel compression data or the second channel compression data based on a run-length scheme.

According to various embodiments, the control circuit may be configured to divide the raw image data into a plurality of partitions, each of the plurality of partitions including a plurality of pixels, and to generate the first bit planes or the second bit planes using data corresponding to the plurality of pixels included in each of the plurality of partitions.

According to various embodiments, the control circuit may be configured to generate a bit stream including an image header data field including at least one piece of information related to the raw image data, a partition header data field including at least one piece of information related to a partition, or a compression data field including data resultant from encoding bit planes, and wherein the control circuit is configured to transmit the bit stream to the processor to enable the processor to decode the data resultant from encoding the bit planes using, at least, the image header data field including the at least one piece of information related to the raw image data, the partition header data field including the at least one piece of information related to the partition, or the compression data field including the data resultant from encoding the bit planes.

Figure 3:
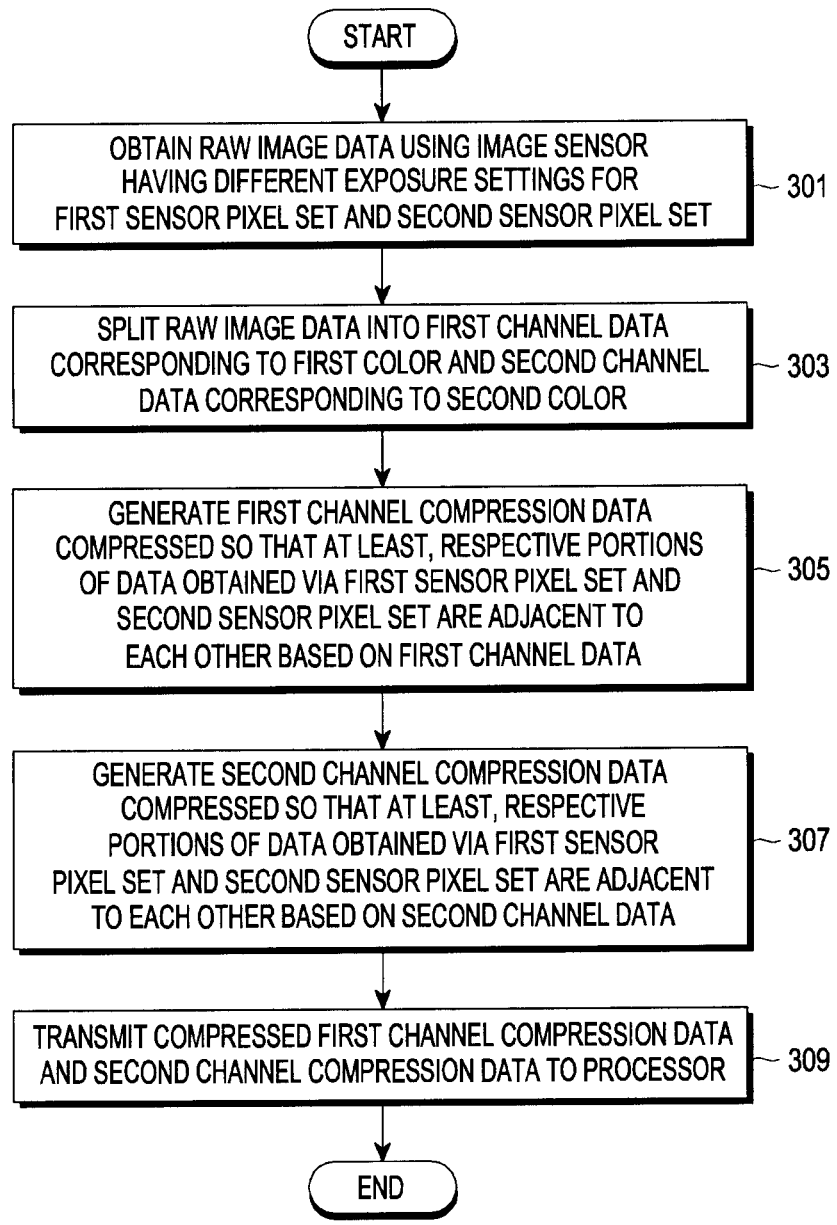
FIG. 3 is a flowchart illustrating a process of transmitting, by an electronic device, HDR image data according to various embodiments.

FIG. 3 is a flowchart illustrating a process of transmitting, by an electronic device, HDR image data according to various embodiments. Referring to FIG. 3, an electronic device (e.g., the image sensor module 110 (e.g., the control circuit 112) of FIG. 1 or the compression module 211 of FIG. 2) may compress or encode raw image data (e.g., HDR image data) according to various embodiments and transmit the compressed or encoded data to the processor 120 or the second device 220. The image sensor 111 included in the image sensor module 110 may include a plurality of pixels, and the plurality of pixels may include a first sensor pixel set and a second sensor pixel set having different exposure settings.

According to various embodiments, the first sensor pixel set may correspond to a first exposure (e.g., exposure amount or exposure value), and the second sensor pixel set may correspond to a second exposure. For example, the first exposure may be a long exposure relatively larger than the second exposure, and the second exposure may be a short exposure relatively smaller than the first exposure.

In operation 301, the electronic device (e.g., the image sensor module 110 (e.g., the control circuit 112) of FIG. 1 or the compression module 211 of FIG. 2) may obtain raw image data (e.g., HDR image data) using the image sensor having different exposures set on the first sensor pixel set and the second sensor pixel set.

In operation 303, the electronic device may split the obtained raw image data into first channel data corresponding to a first color and second channel data corresponding to a second color. The first color or the second color may include a visible light band of color and, according to various embodiments, may include an infrared ray (IR) band.

In operation 305, the electronic device may perform compression so that at least portions of data obtained via the first sensor pixel set are adjacent to each other based on the first channel data and perform compression so that at least portions of data obtained via the second sensor pixel set are adjacent to each other, thereby generating first channel compression data.

In operation 307, the electronic device may perform compression so that at least portions of data obtained via the first sensor pixel set are adjacent to each other based on the second channel data and perform compression so that at least portions of data obtained via the second sensor pixel set are adjacent to each other, thereby generating second channel compression data.

In operation 309, the electronic device may transmit the compressed first channel compression data and the compressed second channel compression data to the processor.

Figure 4:
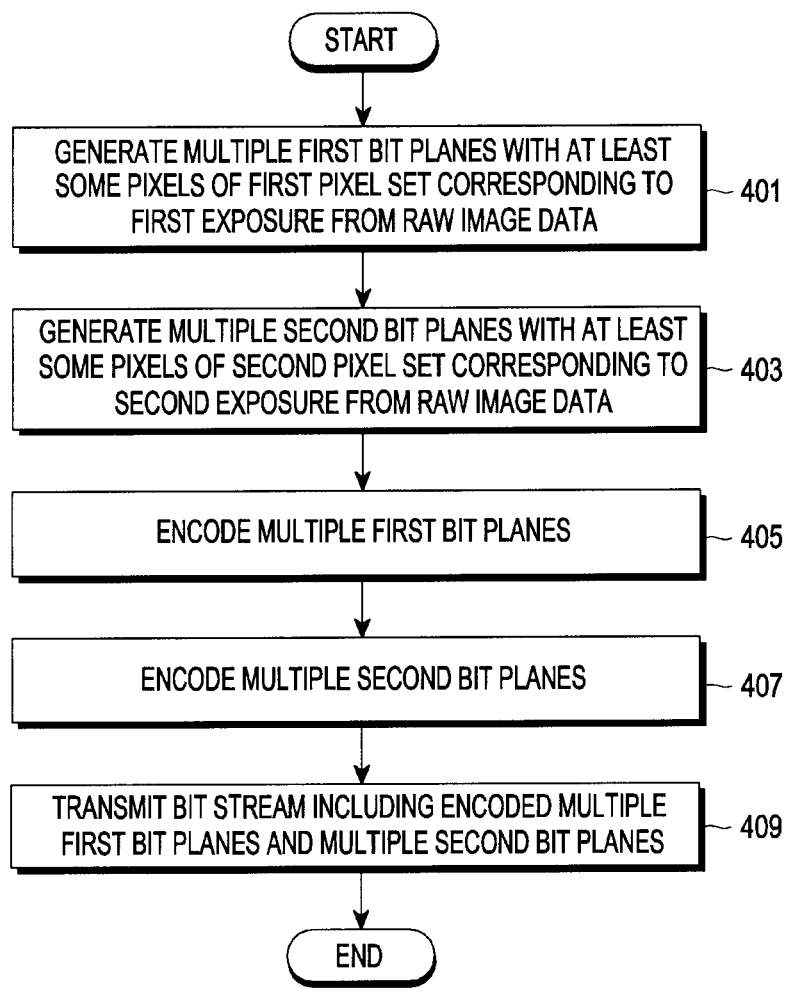
FIG. 4 is a flowchart illustrating a process of transmitting, by an electronic device, transmitted HDR image data according to various embodiments.

FIG. 4 is a flowchart illustrating a process of transmitting, by an electronic device, HDR image data according to various embodiments of the present invention. Referring to FIG. 4, an electronic device (e.g., the image sensor module 110 (e.g., the control circuit 112) of FIG. 1 or the compression module 211 of FIG. 2) may compress or encode raw image data (e.g., HDR image data) according to various embodiments and transmit the compressed or encoded data to the processor.

In operation 401, the electronic device may generate a plurality of first bit planes with at least some of first pixels corresponding to a first exposure (e.g., an exposure amount or exposure value) from the raw image data (e.g., HDR image data). According to various embodiments, the first exposure may be a long exposure which is a relatively large exposure.

In operation 403, the electronic device may generate a plurality of second bit planes with at least some of second pixels corresponding to a second exposure from the raw image data. According to various embodiments, the second exposure may be a short exposure which is a relatively small exposure.

According to various embodiments, the electronic device may split the raw image data into a plurality of color channels and convert at least part of data corresponding to at least one of the plurality of color channels into a gray code.

According to various embodiments, the electronic device may generate a bit plane with data of the same position of each pixel value. More specifically, according to various embodiments, the electronic device may generate a plurality of bit planes constituted based on the bit position of each pixel value for the plurality of pixels corresponding to at least part of the HDR image data which has been converted into the gray code.

In operation 405, the electronic device may compress or encode the plurality of generated first bit planes.

In operation 407, the electronic device may compress or encode the plurality of generated second bit planes.

In operation 409, the electronic device may transmit a bit stream including the plurality of encoded first bit planes and the plurality of encoded second bit planes to the processor or another electronic device.

Specific embodiments in which the electronic device compresses or encodes raw image data are described below.

According to various embodiments, at least one of the operations shown in FIGS. 3 and 4 may be omitted, and at least one other operation may be added between the operations. The operations shown in FIGS. 3 and 4 may be processed in the order as shown, or at least one of the operations may be processed in a different order. Further, the operations shown in FIGS. 3 and 4 may be performed in the electronic device or server. Such an implementation may be made that at least one operation of the operations shown in FIGS. 3 and 4 is performed in the electronic device while the other operations are performed in a server.

According to an embodiment, a method of transmitting high dynamic range image data obtaining raw image data from an image sensor, generating a plurality of first bit planes configured based on a bit position of each pixel value with at least some of a plurality of pixels constituting a first pixel set corresponding to a first exposure for the plurality of pixels corresponding to at least part of the raw image data obtained by the image sensor, generating a plurality of second bit planes configured based on a bit position of each pixel value with at least some of a plurality of pixels constituting a second pixel set corresponding to a second exposure different from the first exposure, encoding each of the plurality of first bit planes and the plurality of second bit planes, and transmitting a bit stream including the encoded first bit planes and second bit planes to a processor.

According to various embodiments, the method may further comprise multiplying a pixel value of each of the pixels constituting the second pixel set based on a ratio of the first exposure to the second exposure by a preset value and generating the second bit planes with at least some of the plurality of pixels constituting the second pixel set.

According to various embodiments, the method may select at least one bit plane to perform encoding based on compression efficiency among the first bit planes and the second bit planes.

According to various embodiments, the method may select the at least one bit plane based on at least one of a pixel value of each of the plurality of pixels constituting the first sensor pixel set, a pixel value of each of the plurality of pixels constituting the second sensor pixel set, numbers of the first bit planes, numbers of the second bit planes, and flat area information for the raw image data.

According to various embodiments, each pixel of the first pixel set and each pixel of the second pixel set are arranged according to a preset pattern on the raw image.

According to various embodiments, the method may further comprise splitting the raw image data obtained from the image sensor into a plurality of color channels and, as part of generating the first bit plane or generating the second bit plane, generating a plurality of bit planes corresponding to each color channel split into.

According to various embodiments, the method may further comprise converting at least a portion of the raw image data obtained from the image sensor into a gray code and generating the first bit planes or the second bit planes for the raw image data converted into the gray code.

According to various embodiments, the method may perform encoding on the plurality of first bit planes or the plurality of second bit planes based on a run-length scheme.

According to various embodiments, the method may further comprise dividing the raw image data into a plurality of partitions, each of the plurality of partitions including a plurality of pixels, and generating the first bit planes or the second bit planes using data corresponding to the plurality of pixels included in each of the plurality of partitions.

According to various embodiments, the method may further comprise generating a bit stream including an image header data field including at least one piece of information related to the raw image data, a partition header data field including at least one piece of information related to a partition, or a compression data field including data resultant from encoding bit planes and transmitting the bit stream to the processor to enable the processor to decode the data resultant from encoding the bit planes using, at least, the image header data field including the at least one piece of information related to the raw image data, the partition header data field including the at least one piece of information related to the partition, or the compression data field including the data resultant from encoding the bit planes.

According to an embodiment, a method for transmitting high dynamic range (HDR) image data comprises obtaining, by an image sensor including a first sensor pixel set and a second sensor pixel set, raw image data using the image sensor having different exposure settings for the first sensor pixel set and the second sensor pixel set, splitting the raw image data into first channel data corresponding to a first color and second channel data corresponding to a second color, generating first channel compression data by performing compression so that at least portions of data obtained via the first sensor pixel set are adjacent to each other and at least portions of data obtained via the second sensor pixel set are adjacent to each other based on the first channel data, generating second channel compression data by performing compression so that at least portions of data obtained via the first sensor pixel set are adjacent to each other and at least portions of data obtained via the second sensor pixel set are adjacent to each other based on the second channel data, and transmitting the compressed first channel compression data and the compressed second channel compression data to a processor.

According to various embodiments, the method may further comprise generating a plurality of first bit planes configured with at least some of a plurality of pixels constituting the first sensor pixel set, based on a bit position of each pixel value, generating a plurality of second bit planes configured with at least some of a plurality of pixels constituting the second sensor pixel set, based on a bit position of each pixel value, and generating the first channel compression data or the second channel compression data by performing compression per first bit plane or per second bit plane.

According to various embodiments, the method may further comprise multiplying a pixel value of each of the plurality of pixels constituting the second sensor pixel set by a preset value based on a ratio of exposure of the first sensor pixel set to exposure of the second sensor pixel set; and generating the second bit planes with at least some of the plurality of pixels constituting the second sensor pixel set.

According to various embodiments, the method may select at least one bit plane to perform encoding based on compression efficiency among the first bit planes and the second bit planes.

According to various embodiments, the method may select the at least one bit plane based on at least one of a pixel value of each of the plurality of pixels constituting the first sensor pixel set, a pixel value of each of the plurality of pixels constituting the second sensor pixel set, numbers of the first bit planes, numbers of the second bit planes, and flat area information for the raw image data.

According to various embodiments, each pixel of the first sensor pixel set and each pixel of the second sensor pixel set may be arranged according to a preset pattern on the raw image data.

According to various embodiments, the method may further comprise converting at least a portion of the raw image data obtained from the image sensor into a gray code and generating the first bit planes or the second bit planes for the raw image data converted into the gray code.

According to various embodiments, the method may generate the first channel compression data or the second channel compression data based on a run-length scheme.

According to various embodiments, the method may further comprise dividing the raw image data into a plurality of partitions, each of the plurality of partitions including a plurality of pixels, and generating the first bit planes or the second bit planes using data corresponding to the plurality of pixels included in each of the plurality of partitions.

According to various embodiments, the method may further comprise generating a bit stream including an image header data field including at least one piece of information related to the raw image data, a partition header data field including at least one piece of information related to a partition, or a compression data field including data resultant from encoding bit planes and transmitting the bit stream to the processor to enable the processor to decode the data resultant from encoding the bit planes using, at least, the image header data field including the at least one piece of information related to the raw image data, the partition header data field including the at least one piece of information related to the partition, or the compression data field including the data resultant from encoding the bit planes.

Hereinafter, described in detail are example devices and methods of encoding and transmitting HDR image data by an electronic device according to various embodiments and decoding the transmitted data.

Figure 5:
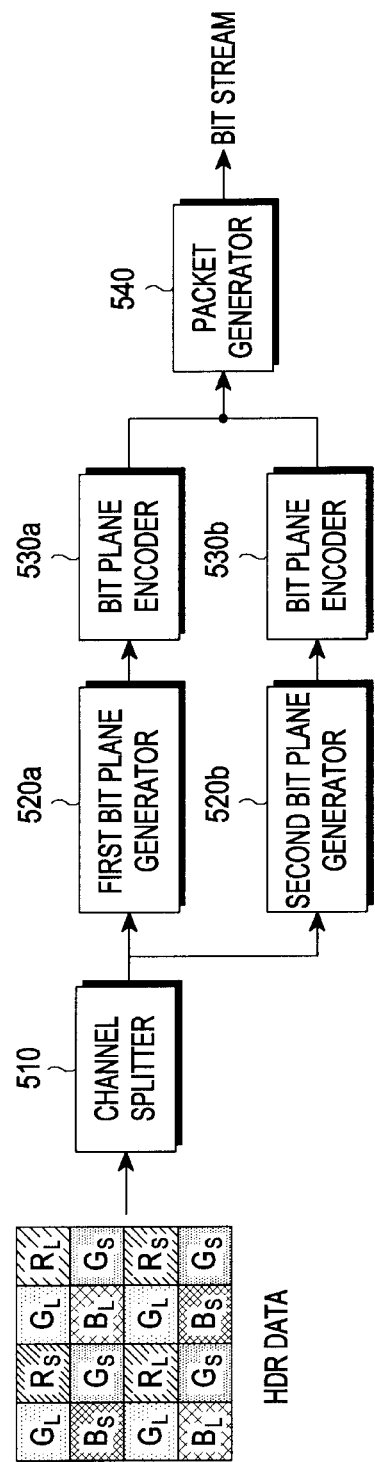
FIG. 5 is a block diagram illustrating a detailed structure of an electronic device of transmitting HDR image data according to various embodiments.

FIG. 5 is a block diagram illustrating a detailed structure of an electronic device of transmitting HDR image data according to various embodiments. Referring to FIG. 5, according to various embodiments, an electronic device (e.g., the image sensor module 110 of FIG. 1 or the compression module 211 of FIG. 2) transmitting HDR image data may include at least one of a channel splitter 510, a first bit plane generator 520a, a second bit plane generator 520b, a first bit plane encoder 530a, a second bit plane encoder 530b, or a packet generator 540.

According to various embodiments, the HDR image data (or HDR data) may be Bayer image data as shown. In various embodiments described below, Bayer image data is described as an example of the HDR image data for aiding in understanding the present invention. However, according to various embodiments, the type of the HDR image data is not limited to Bayer image data but may rather include various types of image data (e.g., Foveon image data).

According to various embodiments, the plurality of pixels constituting the HDR image data may be divided into long exposure pixels (denoted by subscript L in the drawings) which have a relatively long exposure and short exposure pixels (denoted by subscript S in the drawings) which have a relatively short exposure.

The channel splitter 510 may divide, per color, the pixels constituting the HDR image data and reconstruct the same. For example, since each of the pixels constituting the Bayer image data has a color R, $G_1$, $G_2$, or B, the channel splitter 510 may divide, per color, the pixels constituting the HDR image data. For example, since the Bayer image data output from the image sensor (e.g., the image sensor 111 of FIG. 1) has only one color channel per pixel, the correlation between the adjacent pixels may be lowered. According to various embodiments, the correlation between consecutive pieces of data may be increased by dividing the pixels into channels of the same color via the channel splitter 510.

According to various embodiments, the channel splitter 510 may divide, per exposure, the pixels constituting the HDR image data and reconstruct the same. For example, the pixels constituting the HDR image may be constituted of long exposure pixels of $R_L$, $G_L$, and $B_L$ and short exposure pixels of $R_S$, $G_S$, and $B_S$. According to various embodiments, the channel splitter 510 may divide the pixels constituting the HDR image data into the long exposure pixels and the short exposure pixels and reconstruct the same.

According to various embodiments, the channel splitter 510 may reconstruct the pixels constituting the HDR image data considering both the colors and exposures.

According to various embodiments, data of the first exposure (e.g., long exposure) pixels reconstructed via the channel splitter 510 may be provided to the first bit plane generator 520a, and data of the second exposure (e.g., short exposure) pixels may be provided to the second bit plane generator 520b.

The first bit plane generator 520a may generate bit planes with the data of the same bit position of each pixel value for the first exposure pixels provided via the channel splitter 510. More specifically, according to various embodiments, the first bit plane generator 520a may generate a plurality of first bit planes constituted based on the bit position of each pixel value for the first exposure (e.g., long exposure) pixels corresponding to at least part of the HDR image data. The first bit planes generated via the first bit plane generator 520a may be encoded via the first bit plane encoder 530a.

The second bit plane generator 520b may generate bit planes with data of the same bit position of each pixel value for the second exposure pixels provided via the channel splitter 510. More specifically, according to various embodiments, the second bit plane generator 520b may generate a plurality of second bit planes constituted based on the bit position of each pixel value for the second exposure (e.g., short exposure) pixels corresponding to at least part of the HDR image data. The second bit planes generated via the second bit plane generator 520b may be encoded via the second bit plane encoder 530b.

The first bit plane encoder 530a or the second bit plane encoder 530b may be configured of a run-length encoder, and the run-length encoder may include a check-run unit and a binarization unit. The binarization unit may perform binarization by referring to the run-length value input from the check-run unit and the index indicating the method to be used for binarization on the corresponding bit plane.

According to various embodiments, the binarization method performed by the binarization unit may be selectively applied depending on the distribution probability characteristics, such as kth-order Exp-Golmb, Unary, Truncation Unary, Truncation Unary+kth-order Exp-Golmb, Golmb rice, etc., as exemplified in Tables 1 to 3.

TABLE 1

| EG-0 | | | | |
|---|---|---|---|---|
| Prefix | Suffix | Value Range | Value Range | Num of bit |
| 0 | | 0 | 0 | 1 |
| 10 | X | 2 | 2 | 3 |
| 110 | XX | 4 | 6 | 5 |
| 1110 | XXX | 8 | 14 | 7 |
| 11110 | XXXX | 16 | 30 | 9 |
| 111110 | XXXXX | 32 | 62 | 11 |
| 1111110 | XXXXXX | 64 | 126 | 13 |
| 11111110 | XXXXXXX | 128 | 254 | 15 |
| 111111110 | XXXXXXXX | 256 | 510 | 17 |
| 1111111110 | XXXXXXXXX | 512 | 1022 | 19 |
| 11111111110 | XXXXXXXXXX | 1024 | 2046 | 21 |
| 111111111110 | XXXXXXXXXXX | 2048 | 4094 | 23 |
| 1111111111110 | XXXXXXXXXXXX | 4096 | 8190 | 25 |

TABLE 2

| EG-2 | | | | |
|---|---|---|---|---|
| Prefix | Suffix | Value Range | Value Range | Num of bit |
| 0 | XX | 4 | 3 | 3 |
| 10 | XXX | 8 | 11 | 5 |
| 110 | XXXX | 16 | 27 | 7 |
| 1110 | XXXXX | 32 | 59 | 9 |
| 11110 | XXXXXX | 64 | 123 | 11 |
| 111110 | XXXXXXX | 128 | 251 | 13 |
| 1111110 | XXXXXXXX | 256 | 507 | 15 |
| 11111110 | XXXXXXXXX | 512 | 1019 | 17 |
| 111111110 | XXXXXXXXXX | 1024 | 2043 | 19 |
| 1111111110 | XXXXXXXXXXX | 2048 | 4091 | 21 |
| 11111111110 | XXXXXXXXXXXX | 4096 | 8187 | 23 |
| 111111111110 | XXXXXXXXXXXXX | 8192 | 16379 | 25 |
| 1111111111110 | XXXXXXXXXXXXXX | 19384 | 32763 | 27 |

TABLE 3

| Value | Bin String |
|---|---|
| 0 | 0 |
| 1 | 10 |
| 2 | 110 |
| 3 | 1110 |
| 4 | 11110 |
| 5 | 1111100 |
| 6 | 1111101 |

According to various embodiments, the binarization method to be applied per bit plane by the binarization unit may be added, as header information, and transmitted by the packet generator 540.

According to various embodiments, the bit plane adjacent to the MSB among the plurality of first bit planes or the plurality of second bit planes may happen to have the same value for all the pixels in the same partition. In such a case, since the data of the corresponding bit plane has the same bit, for the bit plane, information indicating that all the values are the same, rather than the run-length value, may be included and transmitted in the header information.

According to various embodiments, as a method of transmitting the information indicating that the corresponding bit plane has the same values for all, a flag indicating whether each bit plane has the same values for all may be transmitted.

According to various embodiments, a method of representing the number of bit planes which have all the same values is represented in relation to the highest one may be used by the nature in which a most of bit planes with the same values begin from the highest bit plane.

According to various embodiments, per-channel pixel data split into by the channel splitter 510 is converted into gray code data and may then be provided to each bit plane generator 520a and 520b.

The bit plane generators 520a and 520b may generate a plurality of bit planes based on the bit position of each pixel value for the plurality of pixels corresponding to at least part of the HDR image data which has been converted into the gray code. For example, if the pixel value of each pixel is binarized to have a total of 10 places from 0 to 9, 10 bit planes may be generated based on the bit value of the same place for each pixel. According to various embodiments, the number of pixels for generating the bit planes may be set to differ. According to various embodiments, for aiding in understanding, the unit of pixels for generating one bit plane may be denoted a frame, subframe, partition, or subpartition. According to various embodiments, the whole image data may be divided into a plurality of partitions with the same size or into a plurality of partitions with different sizes.

The bit plane encoders 530a and 530b may receive the plurality of bit planes from the bit plane generators 520a and 520b and perform compression on a per-bit plane unit basis. For example, the bit plane encoders 530a and 530b may separately include N+1 bit plane encoders from the zeroth bit plane encoder to the Nth bit plane encoder depending on the number of bit planes. Each bit plane encoder may perform encoding by the same algorithm or by different algorithms. According to various embodiments, each bit plane encoder may be implemented to encode the bit planes by the algorithm with the highest compression efficiency considering the distribution of the bit values constituting the corresponding bit plane.

According to various embodiments, the packet generator 540 may select the plurality of encoded bit planes, thereby generating a packet. According to various embodiments, the packet generator 540 may generate a packet by further including the partition-related information along with information about the compressed or encoded bit planes.

Figure 6:
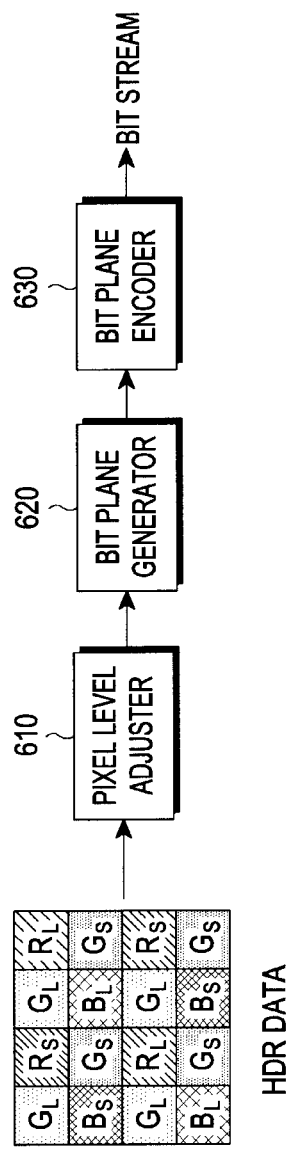
FIG. 6 is a block diagram illustrating a detailed structure of an electronic device of transmitting HDR image data according to various embodiments.

FIG. 6 is a block diagram illustrating a detailed structure of an electronic device of transmitting HDR image data according to various embodiments. Referring to FIG. 6, according to various embodiments, an electronic device (e.g., the image sensor module 110 of FIG. 1 or the compression module 211 of FIG. 2) transmitting HDR image data may include at least one of a pixel level adjuster 610, a bit plane generator 620, or a bit plane encoder 630.

According to various embodiments, the HDR image data may be Bayer image data as shown. According to various embodiments, the plurality of pixels constituting the HDR image data may be divided into long exposure pixels (denoted by subscript L in the drawings) which have a relatively long exposure and short exposure pixels (denoted by subscript S in the drawings) which have a relatively short exposure.

According to various embodiments, the pixel level adjuster 610 may readjust the exposure for each pixel constituting the HDR image data. For example, for the HDR image data constituted of long exposure pixels and short exposure pixels as shown, a ratio of the exposure of the long exposure pixels to the exposure of the short exposure pixels may be determined as a fixed value in one frame.

The pixel level adjuster 610 may readjust the short exposure pixels and the long exposure pixels to have similar exposure levels via the process of multiplying each pixel set to have a short exposure by the gain corresponding to the exposure ratio. The correlation between the long exposure pixel and short exposure pixel adjacent to each other may be increased by pixel level readjustment by the pixel level adjuster 610. If the correlation between the long exposure pixel and short exposure pixel adjacent to each other rises, compression efficiency may be raised by generating the bit plane with the long exposure pixel and short exposure pixel adjacent to each other and performing encoding.

According to various embodiments, the data of pixels for which the exposure level has been readjusted via the pixel level adjuster 610 may be provided to the bit plane generator 620.

The bit plane generator 620 may generate the bit plane with the data of the same bit position of each pixel value for the pixels provided via the pixel level adjuster 610. The bit planes generated via the bit plane generator 620 may be encoded via the bit plane encoder 630.

The bit plane encoder 630 may be configured of a run-length encoder, and the run-length encoder may include a check-run unit and a binarization unit. The binarization unit may perform binarization by referring to the run-length value input from the check-run unit and the index indicating the method to be used for binarization on the corresponding bit plane.

According to various embodiments, the binarization method performed by the binarization unit may be selectively applied depending on the distribution probability characteristics, such as kth-order Exp-Golmb, Unary, Truncation Unary, Truncation Unary+kth-order Exp-Golmb, Golmb rice, etc., as exemplified in Tables 1 to 3 above.

According to various embodiments, the binarization method to be applied per bit plane by the binarization unit may be added, as header information, and transmitted by the packet generator.

According to various embodiments, the bit plane adjacent to the MSB among the plurality of bit planes may happen to have the same value for all the pixels in the same partition. In such a case, since the data of the corresponding bit plane has the same bit, for the bit plane, information indicating that all the values are the same, rather than the run-length value, may be included and transmitted in the header information.

According to various embodiments, as a method of transmitting the information indicating that the corresponding bit plane has the same values for all, a flag indicating whether each bit plane has the same values for all may be transmitted. According to various embodiments, a method of representing the number of bit planes which have all the same values is represented in relation to the highest one may be used by the nature in which a most of bit planes with the same values begin from the highest bit plane.

According to various embodiments, for the pixel data whose exposure level has been readjusted by the pixel level adjuster 610, the binary data is converted into gray code data and may then be provided to the bit plane generator 620.

The bit plane generator 620 may generate a plurality of bit planes based on the bit position of each pixel value for the plurality of pixels corresponding to at least part of the HDR image data which has been converted into the gray code. For example, if the pixel value of each pixel is binarized to have a total of 10 places from 0 to 9, 10 bit planes may be generated based on the bit value of the same place for each pixel. According to various embodiments, the number of pixels for generating the bit planes may be set to differ.

According to various embodiments, for aiding in understanding, the unit of pixels for generating one bit plane is denoted a frame, subframe, partition, or subpartition. According to various embodiments, the whole image data may be divided into a plurality of partitions with the same size or into a plurality of partitions with different sizes.

The bit plane encoder 630 may receive the plurality of bit planes from the bit plane generator 620 and perform compression on a per-bit plane unit basis. For example, the bit plane encoder 630 may separately include N+1 bit plane encoders from the zeroth bit plane encoder to the Nth bit plane encoder depending on the number of bit planes. The bit plane encoder 630 may perform encoding by the same algorithm or by different algorithms. According to various embodiments, the bit plane encoder may be implemented to encode the bit planes by the algorithm with the highest compression efficiency considering the distribution of the bit values constituting the corresponding bit plane.

Figure 7:
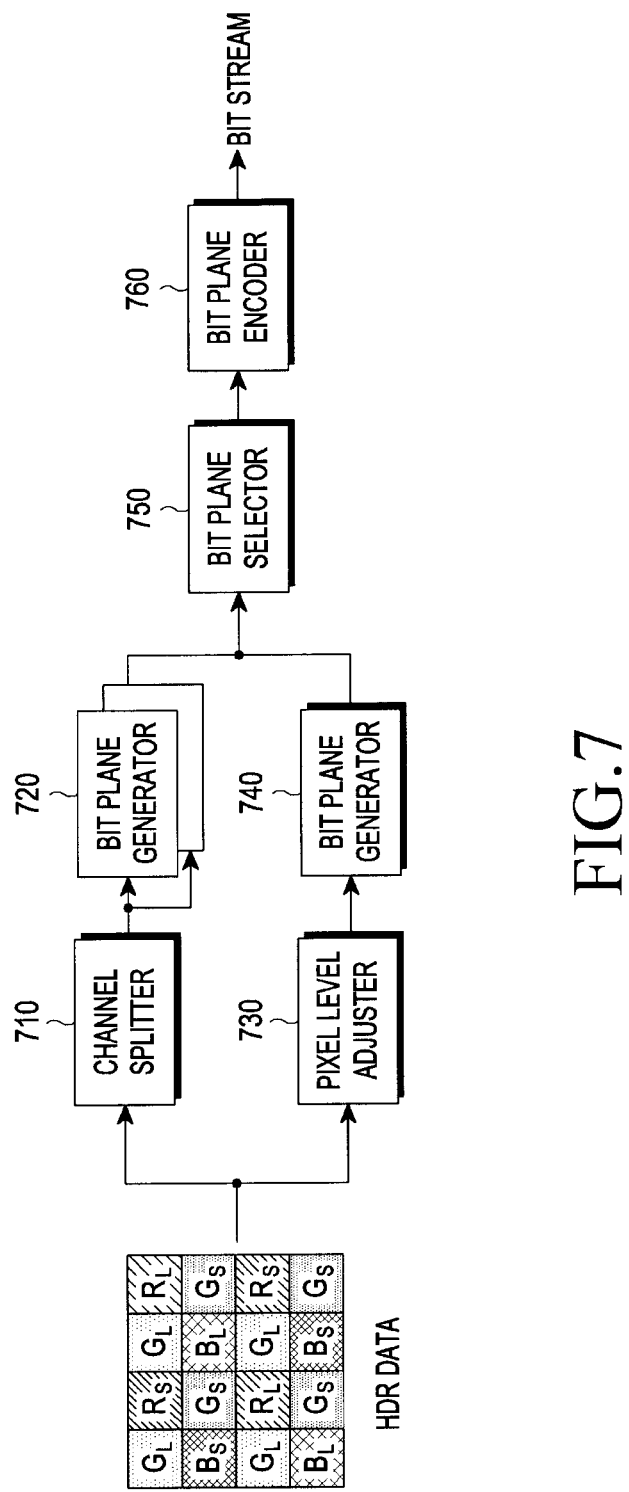
FIG. 7 is a block diagram illustrating a detailed structure of an electronic device of transmitting HDR image data according to various embodiments.

FIG. 7 is a block diagram illustrating a detailed structure of an electronic device of transmitting HDR image data according to various embodiments. Referring to FIG. 7, according to various embodiments, an electronic device (e.g., the image sensor module 110 of FIG. 1 or the compression module 211 of FIG. 2) transmitting HDR image data may include at least one of a channel splitter 710, a bit plane generator 720, a pixel level adjuster 730, a bit plane generator 720, a pixel level adjuster 730, a bit plane generator 740, a bit plane selector 750, or a bit plane encoder 760.

According to various embodiments, the HDR image data may be Bayer image data as shown. In various embodiments described below, Bayer image data is described as an example of the HDR image data for aiding in understanding the present invention. However, according to various embodiments, the type of the HDR image data is not limited to Bayer image data but may rather include various types of image data (e.g., Foveon image data).

According to various embodiments, the plurality of pixels constituting the HDR image data may be divided into long exposure pixels (denoted by subscript L in the drawings) which have a relatively long exposure and short exposure pixels (denoted by subscript S in the drawings) which have a relatively short exposure.

The channel splitter 710 may divide, per color, the pixels constituting the HDR image data and reconstruct the same. For example, since each of the pixels constituting the Bayer image data has a color R, $G_1$, $G_2$, or B, the channel splitter 710 may divide, per color, the pixels constituting the HDR image data. For example, since the Bayer image data output from the image sensor has only one color channel per pixel, the correlation between the adjacent pixels may be lowered. According to various embodiments, the correlation between consecutive pieces of data may be increased by dividing the pixels into channels of the same color via the channel splitter 710.

According to various embodiments, the channel splitter 710 may divide, per exposure, the pixels constituting the HDR image data and reconstruct the same. For example, the pixels constituting the HDR image may be constituted of long exposure pixels of $R_L$, $G_L$, and $B_L$ and short exposure pixels of $R_S$, $G_S$, and $B_S$. According to various embodiments, the channel splitter 710 may divide the pixels constituting the HDR image data into the long exposure pixels and the short exposure pixels and reconstruct the same.

According to various embodiments, the channel splitter 710 may reconstruct the pixels constituting the HDR image data considering both the colors and exposures.

According to various embodiments, data of the first exposure (e.g., long exposure) pixels and data of the second exposure (e.g., short exposure) pixels reconstructed via the channel splitter 710 may be separately provided to a plurality of first bit plane generators 720.

Each first bit plane generator 720 may generate bit planes with the data of the same bit position of each pixel value for the first exposure pixels and the second exposure pixels, respectively, provided via the channel splitter 710. More specifically, according to various embodiments, the first bit plane generator 720 may generate a plurality of first bit planes constituted based on the bit position of each pixel value for the first exposure (e.g., long exposure) pixels corresponding to at least part of the HDR image data and a plurality of second bit planes constituted based on the bit position of each pixel value for the second exposure (e.g., short exposure) pixels.

According to various embodiments, the pixel level adjuster 730 may readjust the exposure for each pixel constituting the HDR image data. For example, for the HDR image data constituted of long exposure pixels and short exposure pixels as shown, a ratio of the exposure of the long exposure pixels to the exposure of the short exposure pixels may be determined as a fixed value in one frame.

The pixel level adjuster 730 may readjust the short exposure pixels and the long exposure pixels to have similar exposure levels via the process of multiplying each pixel set to have a short exposure by the gain corresponding to the exposure ratio. The correlation between the long exposure pixel and short exposure pixel adjacent to each other may be increased by pixel level readjustment by the pixel level adjuster 730. If the correlation between the long exposure pixel and short exposure pixel adjacent to each other rises, compression efficiency may be raised by generating the bit plane with the long exposure pixel and short exposure pixel adjacent to each other and performing encoding.

According to various embodiments, the data of pixels for which the exposure level has been readjusted via the pixel level adjuster 730 may be provided to the second bit plane generator 740. The second bit plane generator 740 may generate the bit plane with the data of the same bit position of each pixel value for the pixels provided via the pixel level adjuster 730.

The bit plane selector 750 may select the high-compression efficiency bit plane among the bit planes generated via the first bit plane generator 720 and the second bit plane generator 740 based on per-bit plane characteristics and information obtainable from the HDR image data (e.g., pixel level information, bit plane number, and flat area information).

According to various embodiments, the bit plane selector 750 may select the high-compression efficiency bit plane among the bit planes generated via the first bit plane generator 720 and the second bit plane generator 740 on a per-frame basis or a per-preset partition basis for the raw image data. For example, the bit plane selector 750 may select bit planes generated via the first bit plane generator 720 for a first frame in the raw image data and may select bit planes generated via the second bit plane generator 740 for a second frame. According to various embodiments, the bit plane selector 750 may select bit planes generated via the first bit plane generator 720 for a first partition in the raw image data and may select bit planes generated via the second bit plane generator 740 for a second partition.

The bit plane encoder 760 may encode each bit plane selected via the bit plane selector 750. The bit plane encoder 760 may be configured of a run-length encoder, and the run-length encoder may include a check-run unit and a binarization unit. The binarization unit may perform binarization by referring to the run-length value input from the check-run unit and the index indicating the method to be used for binarization on the corresponding bit plane.

According to various embodiments, the binarization method performed by the binarization unit may be selectively applied depending on the distribution probability characteristics, such as kth-order Exp-Golmb, Unary, Truncation Unary, Truncation Unary+kth-order Exp-Golmb, Golmb rice, etc., as exemplified in Tables 1 to 3 above.

According to various embodiments, the binarization method to be applied per bit plane by the binarization unit may be added, as header information, and transmitted by the packet generator.

According to various embodiments, the bit plane adjacent to the MSB among the plurality of bit planes may happen to have the same value for all the pixels in the same partition. In such a case, since the data of the corresponding bit plane has the same bit, for the bit plane, information indicating that all the values are the same, rather than the run-length value, may be included and transmitted in the header information.

According to various embodiments, as a method of transmitting the information indicating that the corresponding bit plane has the same values for all, a flag indicating whether each bit plane has the same values for all may be transmitted. According to various embodiments, a method of representing the number of bit planes which have all the same values is represented in relation to the highest one may be used by the nature in which a most of bit planes with the same values begin from the highest bit plane.

According to various embodiments, per-channel pixel data split into by the channel splitter 710 is converted into gray code data and may then be provided to the bit plane generator 720.

The bit plane generator 720 may generate a plurality of bit planes based on the bit position of each pixel value for the plurality of pixels corresponding to at least part of the HDR image data which has been converted into the gray code. For example, if the pixel value of each pixel is binarized to have a total of 10 places from 0 to 9, 10 bit planes may be generated based on the bit value of the same place for each pixel. According to various embodiments, the number of pixels for generating the bit planes may be set to differ. According to various embodiments, for aiding in understanding, the unit of pixels for generating one bit plane is denoted a frame, subframe, partition, or subpartition. According to various embodiments, the whole image data may be divided into a plurality of partitions with the same size or into a plurality of partitions with different sizes.

According to various embodiments, for the pixel data whose exposure level has been readjusted by the pixel level adjuster 730, the binary data is converted into gray code data and may then be provided to the bit plane generator 740.

The bit plane generator 740 may generate a plurality of bit planes based on the bit position of each pixel value for the plurality of pixels corresponding to at least part of the HDR image data which has been converted into the gray code. For example, if the pixel value of each pixel is binarized to have a total of 10 places from 0 to 9, 10 bit planes may be generated based on the bit value of the same place for each pixel. According to various embodiments, the number of pixels for generating the bit planes may be set to differ. According to various embodiments, for aiding in understanding, the unit of pixels for generating one bit plane is denoted a frame, subframe, partition, or subpartition. According to various embodiments, the whole image data may be divided into a plurality of partitions with the same size or into a plurality of partitions with different sizes.

The bit plane encoder 760 may receive the plurality of selected bit planes from the bit plane generator 750 and perform compression on a per-bit plane unit basis. For example, the bit plane encoder 760 may separately include N+1 bit plane encoders from the zeroth bit plane encoder to the Nth bit plane encoder depending on the number of bit planes. The bit plane encoder 760 may perform encoding by the same algorithm or by different algorithms. According to various embodiments, the bit plane encoder 760 may be implemented to encode the bit planes by the algorithm with the highest compression efficiency considering the distribution of the bit values constituting the corresponding bit plane.

Figure 8:
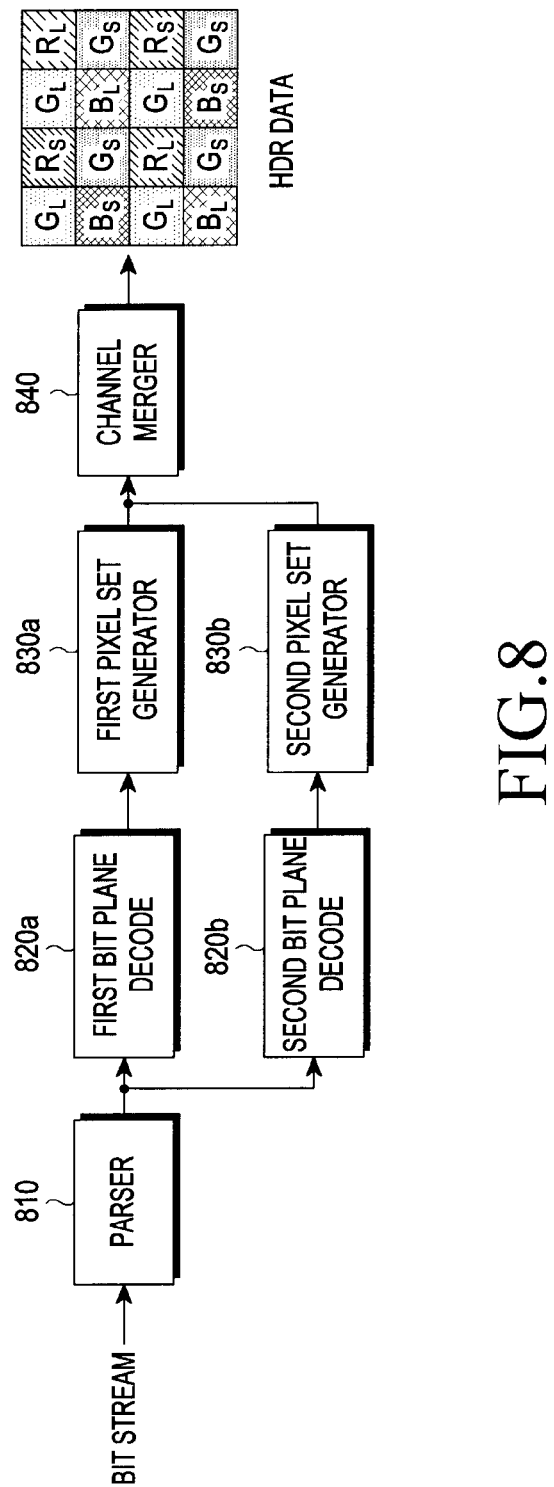
FIG. 8 is a block diagram illustrating a detailed structure of an electronic device of reconstructing received HDR image data according to various embodiments.

FIG. 8 is a block diagram illustrating a detailed structure of an electronic device of reconstructing received HDR image data according to various embodiments. Referring to FIG. 8, according to various embodiments, an electronic device (e.g., the processor 120 of FIG. 1 or the decompression module 221 of FIG. 2) reconstructing or decoding image data may include at least one of a parser 810, a first bit plane decoder 820a, a second bit plane decoder 820b, a first pixel set generator 830a, a second pixel set generator 830b, or a channel merger 840. According to various embodiments, the blocks of FIG. 8 may process data in reverse order corresponding to the processing scheme by the blocks of FIG. 5.

According to various embodiments, when a bit stream including compressed or encoded data is received, the parser 810 may identify the header information of the received bit stream and divide the bit stream per exposure or per color channel and process the bit stream. According to various embodiments, the parser 810 may analyze the received bit stream and provide a bit plane corresponding to a first exposure among the plurality of decoded bit streams to the first bit plane decoder 820a and a bit plane corresponding to a second exposure to the second bit plane decoder 820b.

The first bit plane decoder 820a may receive the plurality of encoded bit planes corresponding to the first exposure from the parser 810 and perform decompression or decoding per bit plane. For example, the first bit plane decoder 820a may separately configure N+1 bit plane decoders from the zeroth bit plane decoder to the Nth bit plane decoder depending on the number of encoded bit planes.

According to various embodiments, each bit plane decoder may perform decoding by the same algorithm or by different algorithms. According to various embodiments, each bit plane decoder may decode the bit plane compressed to correspond to the encoding scheme for the bit plane. According to various embodiments, the compression scheme for each bit plane may be included in a particular data field of the received bit stream, and information about the compression scheme per bit plane included in the received bit stream may be provided through the parser 810 to the first bit plane decoder 820a.

The bit planes corresponding to the first exposure decoded by the first bit plane decoder 820a may be provided to the first pixel set generator 830a. The first pixel set generator 830a may reconstruct the pixel data corresponding to the first exposure before converted to the bit plane from each bit plane decompressed via the first bit plane decoder 820a.

According to various embodiments, since the pixel data converted from the bit plane data is gray code type data, a binary converter may convert the gray code type pixel data into pixel data of binary code.

The second bit plane decoder 820b may receive the plurality of encoded bit planes corresponding to the second exposure from the parser 810 and perform decompression or decoding per bit plane. For example, the second bit plane decoder 820b may separately configure N+1 bit plane decoders from the zeroth bit plane decoder to the Nth bit plane decoder depending on the number of encoded bit planes.

According to various embodiments, each bit plane decoder may perform decoding by the same algorithm or by different algorithms. According to various embodiments, each bit plane decoder may decode the bit plane compressed to correspond to the encoding scheme for the bit plane. According to various embodiments, the compression scheme for each bit plane may be included in a particular data field of the received bit stream, and information about the compression scheme per bit plane included in the received bit stream may be provided through the parser 810 to the second bit plane decoder 820b.

The bit planes corresponding to the second exposure decoded by the second bit plane decoder 820a may be provided to the second pixel set generator 830b. The second pixel set generator 830b may reconstruct the pixel data corresponding to the second exposure before converted to the bit plane from each bit plane decompressed via the second bit plane decoder 820b.

According to various embodiments, since the pixel data converted from the bit plane data is gray code type data, a binary converter may convert the gray code type pixel data into pixel data of binary code.

Since the pixel data converted into binary code by the binary converted is connected per exposure or per color, according to various embodiments, the channel merger 840 may reconstruct the per-exposure, or per-color, channel into the pixel array of the raw image data (e.g., HDR image data), thereby generating HDR image data.

Figure 9:
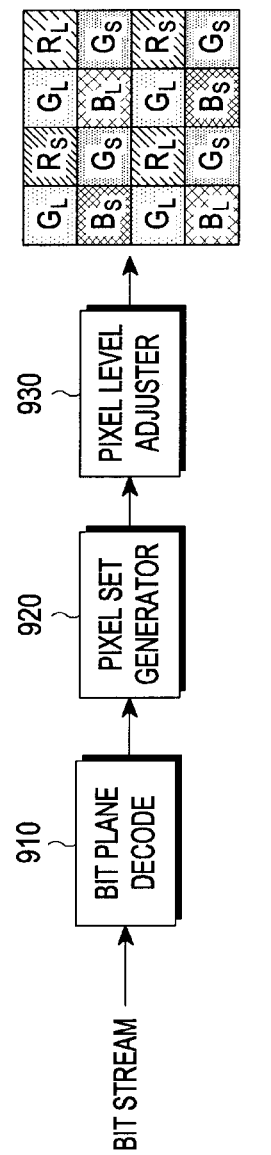
FIG. 9 is a block diagram illustrating a detailed structure of an electronic device of reconstructing received HDR image data according to various embodiments.

FIG. 9 is a block diagram illustrating a detailed structure of an electronic device of reconstructing received HDR image data according to various embodiments. Referring to FIG. 9, according to various embodiments, an electronic device (e.g., the processor 120 of FIG. 1 or the decompression module 221 of FIG. 2) reconstructing or decoding image data may include at least one of a bit plane decoder 910, a pixel set generator 920, or a pixel level adjuster 930. According to various embodiments, the blocks of FIG. 9 may process data in reverse order corresponding to the processing scheme by the blocks of FIG. 6.

According to various embodiments, if a bit stream including compressed or encoded data, the bit plane decoder 910 may perform, per bit plane, decompression or decoding the plurality of encoded bit planes included in the received bit stream. For example, the bit plane decoder 910 may separately configure N+1 bit plane decoders from the zeroth bit plane decoder to the Nth bit plane decoder depending on the number of encoded bit planes.

According to various embodiments, each bit plane decoder 910 may perform decoding by the same algorithm or by different algorithms. According to various embodiments, each bit plane decoder 910 may decode the bit plane compressed to correspond to the encoding scheme for the bit plane. According to various embodiments, the compression scheme for each bit plane may be included in a particular data field of the received bit stream, and information about the compression scheme per bit plane included in the received bit stream may be identified to perform decoding.

The bit planes decoded by the bit plane decoder 910 may be provided to the pixel set generator 920. The pixel set generator 920 may reconstruct the pixel data before converted into the bit plane from each bit plane decompressed via the bit plane decoder 910.

According to various embodiments, since the pixel data converted from the bit plane data is gray code type data, a binary converter may convert the gray code type pixel data into pixel data of binary code.

The pixel data converted into binary code by the binary converter may be input to the pixel level adjuster 930, and the pixel level adjuster 930 may reconstruct the exposure of each pixel to the pre-readjustment level corresponding to the above-described pixel level adjuster 610 of FIG. 6.

According to various embodiments, the pixel level adjuster 930 may readjust the exposure for each pixel constituting the HDR image data. For example, for the HDR image data constituted of long exposure pixels and short exposure pixels as shown, a ratio of the exposure of the long exposure pixels to the exposure of the short exposure pixels may be determined as a fixed value in one frame.

The pixel level adjuster 930 may readjust into the exposure level of the short exposure pixels in the original HDR image data by getting through the process of dividing the gain corresponding to the exposure ratio for each pixel set to have a short exposure. According to various embodiments, as the exposure level of each pixel is readjusted via the pixel level adjuster 930, the original HDR image data may be reconstructed.

Figure 10:
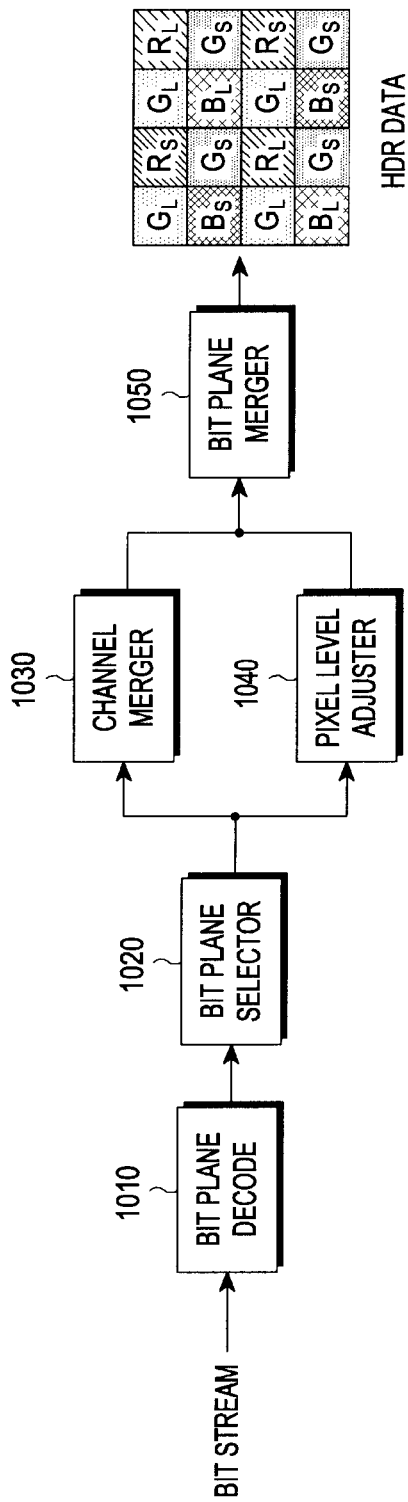
FIG. 10 is a block diagram illustrating a detailed structure of an electronic device of reconstructing received HDR image data according to various embodiments.

FIG. 10 is a block diagram illustrating a detailed structure of an electronic device of reconstructing received HDR image data according to various embodiments. Referring to FIG. 10, according to various embodiments, an electronic device (e.g., the processor 120 of FIG. 1 or the decompression module 221 of FIG. 2) reconstructing or decoding image data may include at least one of a bit plane decoder 1010, a bit plane selector 1020, a channel merger 1030, a pixel level adjuster 1040, or a bit plane merger 1050. According to various embodiments, the blocks of FIG. 10 may process data in reverse order corresponding to the processing scheme by the blocks of FIG. 7.

According to various embodiments, when a bit stream including compressed or encoded data is received, a parser may identify the header information of the received bit stream and divide the bit stream per exposure or per color channel and process the bit stream. According to various embodiments, the parser may analyze the received bit stream, thereby identifying at least one bit stream encoded among a plurality of bit streams. The at least one encoded bit stream may be decoded by the bit plane decoder 1010.

The bit plane selector 1020 may select each of the bit plane separated and decoded according to each exposure among the plurality of bit planes included in the received bit stream and the bit plane for which the exposure level of the short exposure pixels has been readjusted and provide the selected bit plane to the channel merger 1030 or the pixel level adjuster 1040.

For example, the bit plane selector 1020 may provide bit planes separated and decoded according to each exposure among the plurality of bit planes included in the received bit stream to the channel merger 1030, and the bit plane selector 1020 may bit planes for which the exposure level of the short exposure pixels has been readjusted to the pixel level adjuster 1040.

The channel merger 1030 may reconstruct the pixel data before converted into the bit plane from each bit plane decompressed via the bit plane decoder 1010. According to various embodiments, since the pixel data converted from the bit plane data is gray code type data, a binary converter may convert the gray code type pixel data into pixel data of binary code.

The pixel level adjuster 1040 may readjust the exposure for each pixel corresponding to the bit planes for which the exposure level of the short exposure pixels has been readjusted. For example, for the HDR image data constituted of long exposure pixels and short exposure pixels as shown, a ratio of the exposure of the long exposure pixels to the exposure of the short exposure pixels may be determined as a fixed value in one frame.

The pixel level adjuster 1040 may readjust into the exposure level of the short exposure pixels in the original HDR image data by getting through the process of dividing the gain corresponding to the exposure ratio for each pixel set to have a short exposure. According to various embodiments, as the exposure level of each pixel is readjusted via the pixel level adjuster 1040, the original HDR image data may be reconstructed.

The bit plane merger 1050 may merge the pixels merged via the channel merger 1030 and the bit planes for which the exposure level has been readjusted by the pixel level adjuster 1040, thereby reconstructing the original HDR image data. According to various embodiments, the bit plane merger 1050 may reconstruct the pixels per partition.

Figure 11:
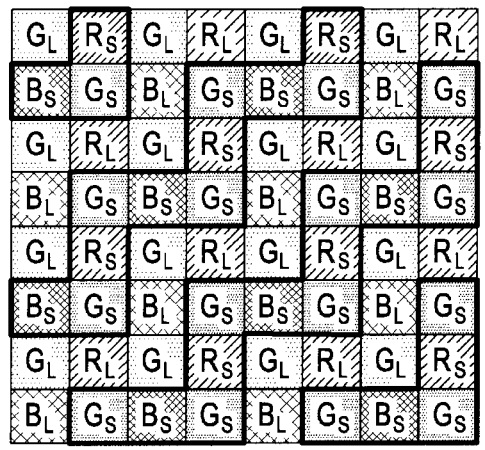
FIG. 11 is a view illustrating a pixel configuration in an image sensor according to various embodiments.
Figure 12:
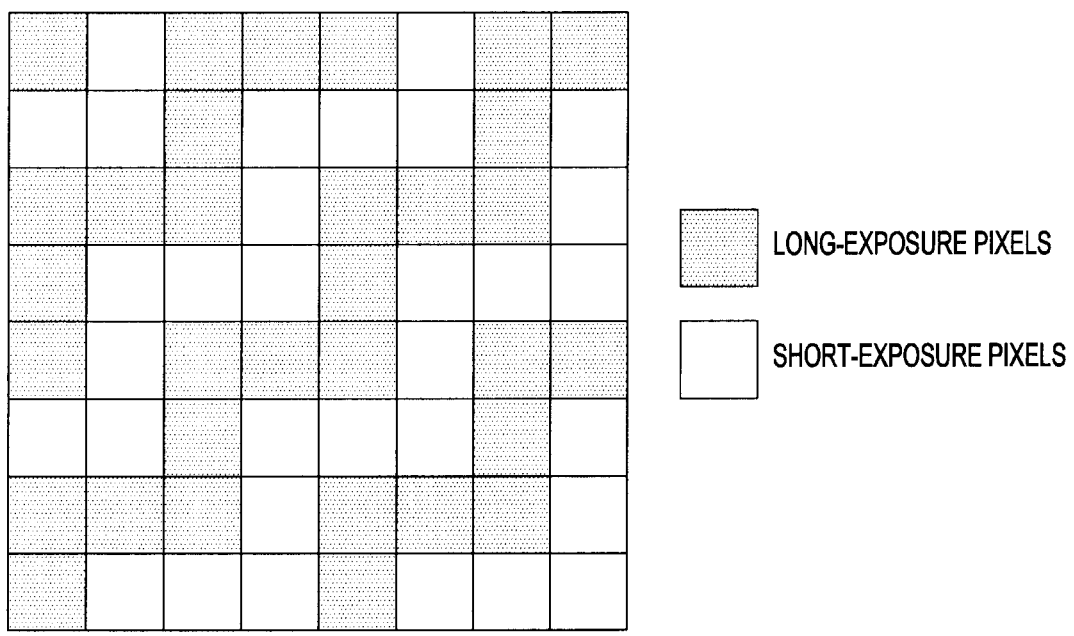
FIG. 12 is a view illustrating an example arrangement of long exposure pixels and short exposure pixels in an image sensor according to various embodiments.

FIGS. 11 and 12 are views illustrating a pixel configuration in an image sensor according to various embodiments. Referring to FIGS. 11 and 12, such an example is shown where pixels of a first exposure (e.g., a long exposure) of an image sensor (e.g., the image sensor 111 of FIG. 1) and pixels of a second exposure (e.g., a short exposure) are arranged according to a selected pattern in some area of the array. According to various embodiments, if the pixels of the first exposure and the pixels of the second exposure are referred to as long exposure pixels and short exposure pixels, respectively, the long exposure pixels and the short exposure pixels may have a polygonal shape. For example, the pixels may be arranged so that at least two very next pixels among the long exposure pixels do not share one side of the polygon, and at least two very next pixels among the short exposure pixels do not share one side of the polygon.

Figure 13:
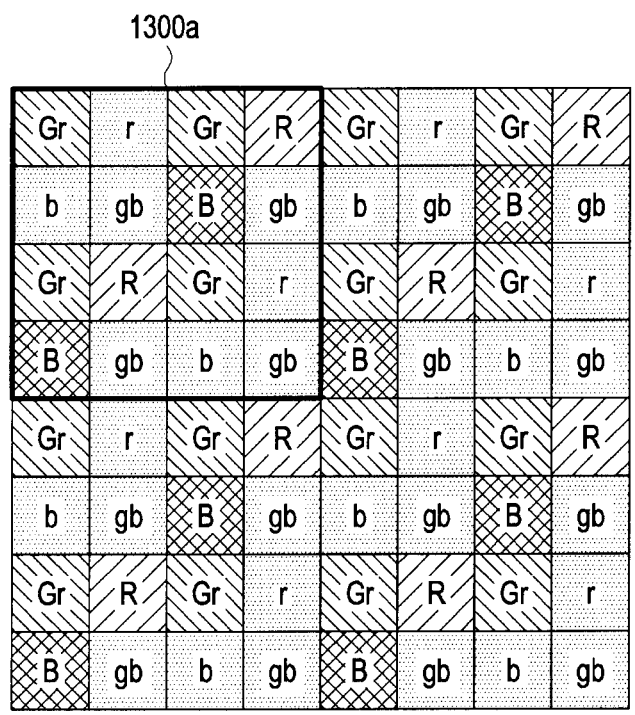
FIG. 13 is a view illustrating a pixel configuration in an image sensor according to various embodiments.

FIG. 13 is a view illustrating a pixel configuration in an image sensor according to various embodiments. FIG. 13 illustrates an example arrangement of long exposure pixels and short exposure pixels in the case where the size of the mask is 4×4. In the example mask 1300*a*, Gr, R, and B pixels are designated as short exposure pixels, and the other r, b, and gb pixels than the Gr, R, and B pixels, are designated as short exposure pixels. For example, three long exposure pixels and one short exposure pixel may be alternately arranged in the horizontal dynamic range in every odd-numbered row, and three short exposure pixels and one long exposure pixel may be alternately arranged in the horizontal dynamic range in every even-numbered row as shown in FIG. 13. At this time, the long exposure pixels arranged in the even-numbered rows may be arranged to meet the long exposure pixels arranged in their neighboring odd-numbered rows.

The above arrangement may produce a cross pattern in which the horizontal straight lines constituted of the long exposure pixels and the vertical straight lines constituted of the short exposure pixels cross each other at predetermined intervals, which may differ from each other. Thus, the long exposure pixels and the short exposure pixels may be shown to be a step-shaped pattern diagonally.

In the above-described example, every three long exposure pixels or every three short exposure pixels are arranged at predetermined intervals, but other various arrangements may also be adopted. For example, at least two first exposure pixels and one second exposure pixel may alternately be arranged.

According to various embodiments, different exposure amounts may be set on the pixels of the first exposure and pixels of the second exposure depending on the dynamic range (e.g., grayscale ratio) of the bright portion and dark portion of the image forming on the image sensor. In some embodiments, the exposure amounts for the first and second exposure pixels may be set by at least one of the exposure time, photoelectric conversion efficiency, and aperture settings.

Figure 14:
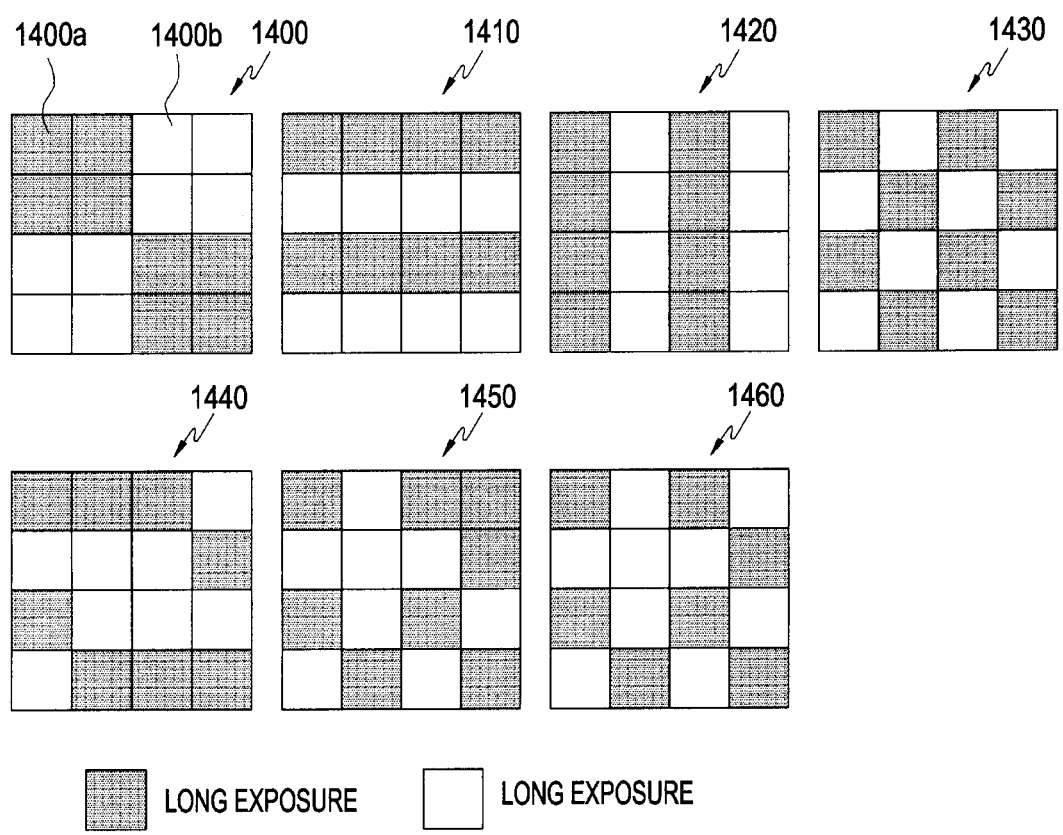
FIG. 14 is a view illustrating various example arrangements of a plurality of pixels in an image sensor according to various embodiments.

FIG. 14 is a view illustrating various example arrangements of a plurality of pixels in an image sensor according to various embodiments. FIG. 14 illustrates various arrangements 1400, 1410, 1420, 1430, 1440, 1450, and 1460 of pixels of first exposure (e.g., long exposure pixels) 1400*a* and pixels of second exposure (e.g., short exposure pixels) 1400*b*. For example, as mentioned above, real-time HDR functionality is achievable by arranging the pixels 1400 constituting the image sensor (e.g., the image sensor 111 of FIG. 1) in at least two separate pixel groups with different exposure amount settings. As shown in FIG. 14, long exposure pixels and short exposure pixels may be arranged in a repeated pattern 1400, 1410, 1420, or 1430 or in an irregular pattern 1440, 1450, or 1460.

Arranging the pixels 1400 constituting the image sensor 1400 in at least two separate pixel groups may be set in a fixed manner during the course of production of the image sensor, or dynamic arrangement may also be possible depending on the capturing mode of the image sensor-equipped device.

According to various embodiments, 'have different exposure amount settings' may mean that the time during which exposure of the long exposure pixels 1400*a* is in progress differs from the time during which exposure of the short exposure pixels 1400*b* is in progress. To set different exposure amounts, in some embodiments, exposure of the short exposure pixels 1400*b* may be performed simultaneously with exposure of the long exposure pixels 1400*a*. In contrast, exposure of the long exposure pixels 1400*a* need not be performed simultaneously with exposure of the short exposure pixels 1400*b*. To set different exposure amounts, in some embodiments, different photoelectric conversion efficiencies may be set on the long exposure pixels 1400*a* and the short exposure pixels 1400*b*. To set different exposure amounts, in some embodiments, different aperture settings may be made on the long exposure pixels 1400*a* and the short exposure pixels 1400*b*. To set different exposure amounts, in some embodiments, different pixel sizes may be set on the long exposure pixels 1400*a* and the short exposure pixels 1400*b*, or the amount of light coming in to the pixels per unit time may be adjusted by adjusting the lens or filter.

Figure 15:
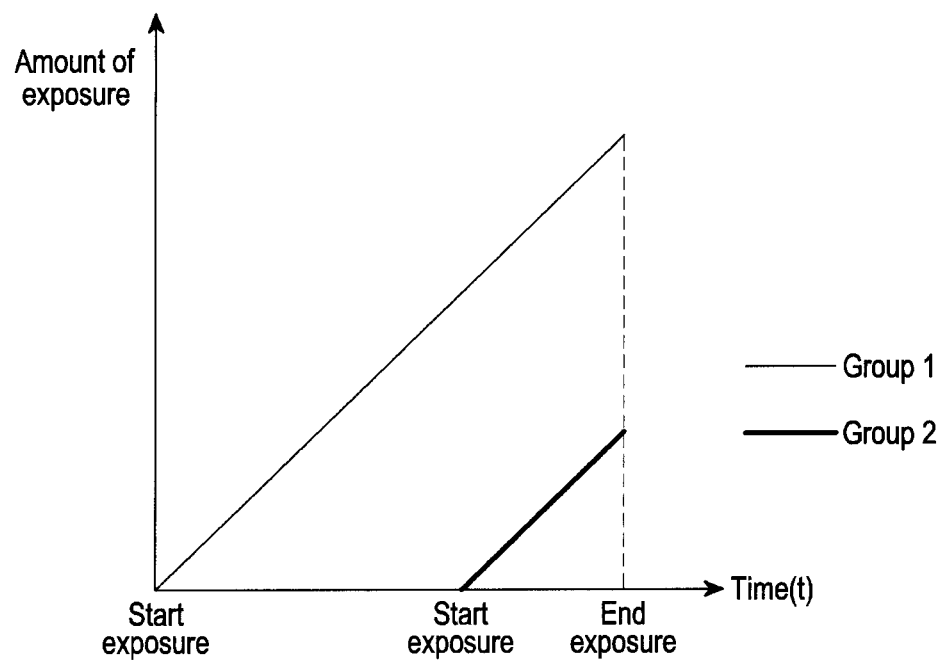
FIG. 15 is a view illustrating a graph related to the operation of exposing pixels in an image sensor according to various embodiments.

FIG. 15 is a view illustrating a graph related to the operation of exposing pixels in an image sensor according to various embodiments.

Referring to FIG. 15, according to various embodiments of the present disclosure, a group Group2 constituted of second exposure pixels, e.g., short exposure pixels 1400*b*, starts exposure later than a group Group 1 constituted of first exposure pixels, e.g., long exposure pixels 1400*a*, and the first exposure pixel group Group 1 and the second exposure pixel group Group2 may end exposure at the same time.

Figure 16:
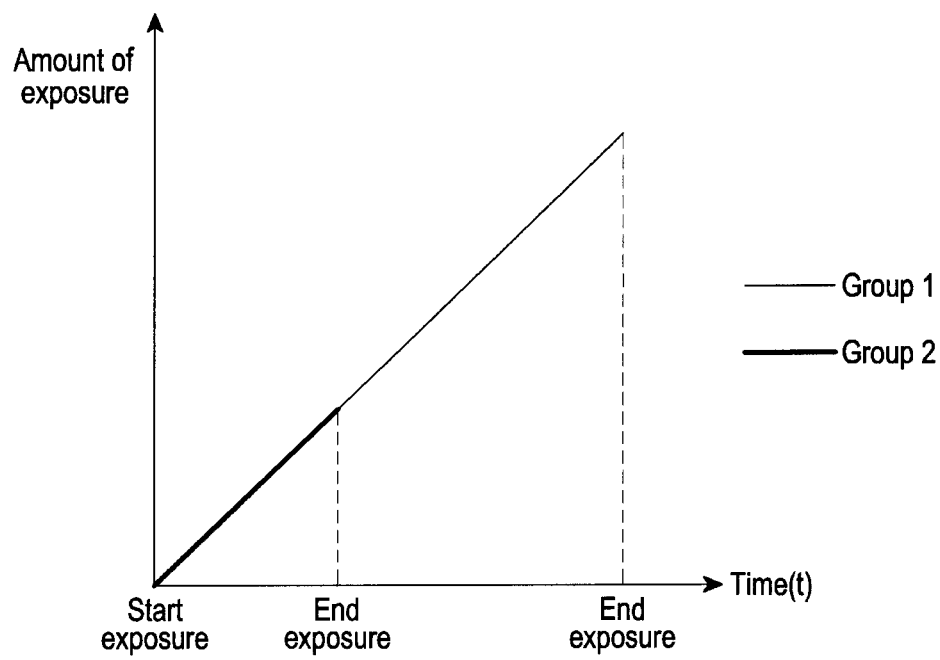
FIG. 16 is a view illustrating a graph related to the operation of exposing pixels in an image sensor according to various embodiments.

FIG. 16 illustrates a configuration in which in an image sensor (e.g., the image sensor 111 of FIG. 1), the pixels of the first and second exposure pixel groups Group 1 and Group2 simultaneously start exposure, and the pixels of the second exposure pixel group Group2 first end exposure according to various embodiments of the disclosure. Further, although not shown, as compared with the start/end of exposure of the first exposure pixel group Group1, the pixels of the second exposure pixel group Group2 may start exposure later but end earlier.

Figure 17:
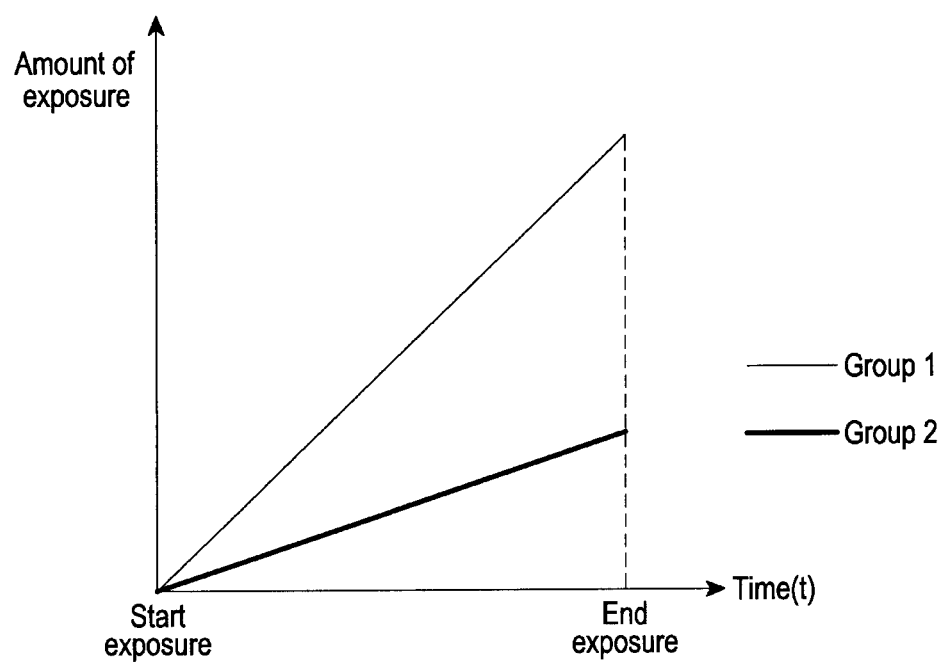
FIG. 17 is a view illustrating a graph related to the operation of exposing pixels in an image sensor according to various embodiments.

FIG. 17 illustrates a configuration in which in an image sensor (e.g., the image sensor 111 of FIG. 1), the pixels of the first and second exposure pixel groups Group1 and Group2 simultaneously start exposure and, after performing exposure with different photoelectric efficiencies, they end exposure at the same time according to various embodiments of the disclosure.

Figure 18:
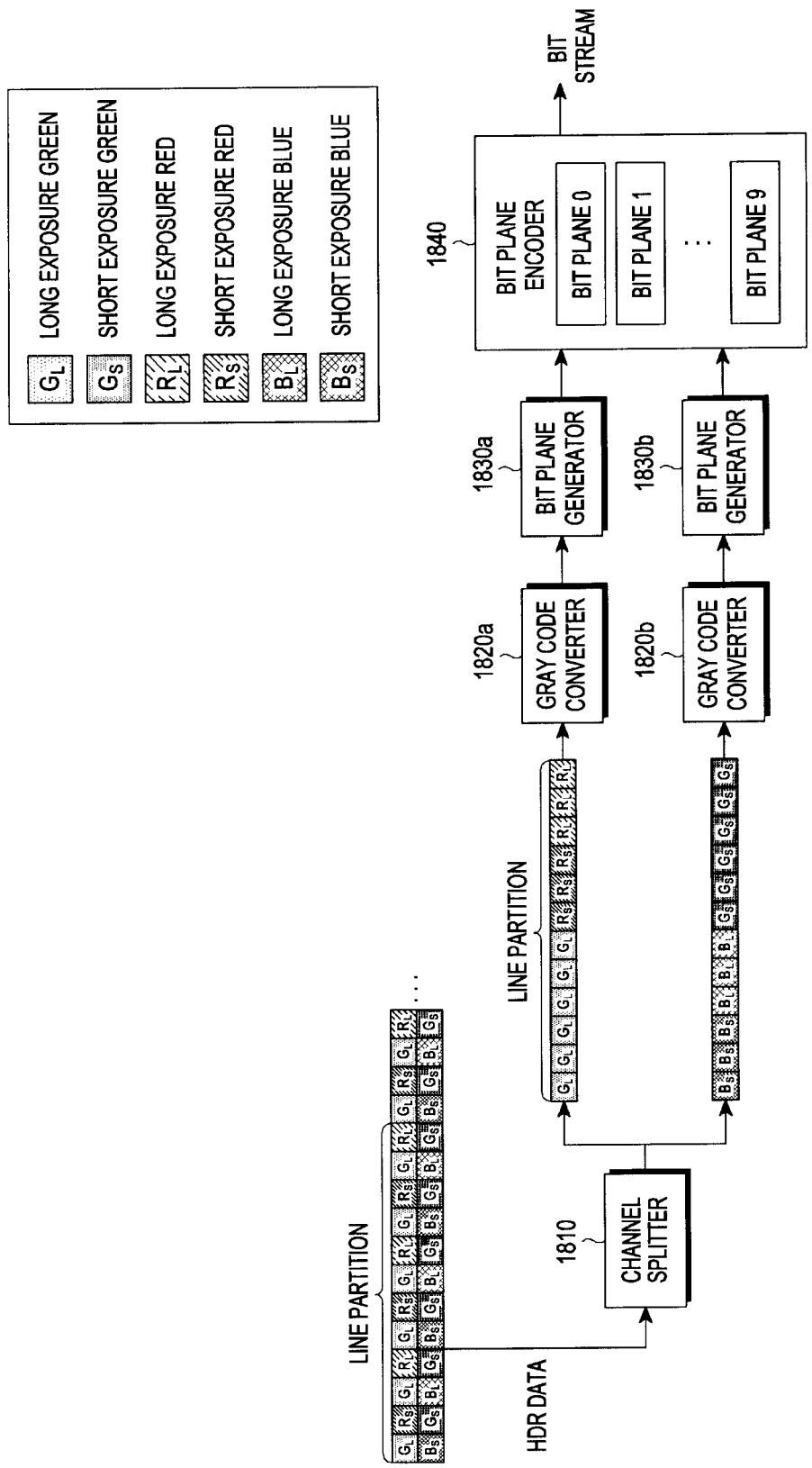
FIG. 18 is a block diagram illustrating a detailed structure of an electronic device of encoding HDR image data according to various embodiments.

FIG. 18 is a block diagram illustrating a detailed structure of an electronic device of encoding HDR image data according to various embodiments. Referring to FIG. 18, according to various embodiments, an electronic device (e.g., the image sensor module 110 of FIG. 1 or the compression module 211 of FIG. 2) transmitting HDR image data may include at least one of a channel splitter 1810, gray code converters 1820a and 1820b, bit plane generators 1830a and 1830b, or a bit plane encoder 1840.

According to various embodiments, the HDR image data may be Bayer image data and may be processed per partition as shown. According to various embodiments, the plurality of pixels constituting the HDR image data may be divided into long exposure pixels (denoted by subscript L in the drawings) which have a relatively long exposure and short exposure pixels (denoted by subscript S in the drawings) which have a relatively short exposure.

The channel splitter 1810 may divide, per line, pixels input per partition through two lines, split per color or per exposure for each line, and perform reconstruction. For example, the pixels constituting the Bayer image data are divided into $G_L$, $R_S$, and $R_L$ for the first line and are reconstructed, and the pixels are divided into $B_S$, $B_L$, and $G_S$ in the second line and are reconstructed.

The channel splitter 1810 may divide the pixels constituting the HDR image data per color and per exposure. For example, since the HDR image data output from the image sensor may have a different exposure setting per adjacent pixel, the correlation between adjacent pixels may be lowered. According to various embodiments, the correlation between consecutive pieces of data may be increased by dividing the pixels into channels of the same color and the same exposure via the channel splitter 1810.

According to various embodiments, the data of the first line pixels reconstructed via the channel splitter 1810 may be provided to the first gray code converter 1820 and the first bit plane generator 1830a, and the data of the second line pixels may be provided to the second gray code converter 1820b and the second bit plane generator 1830b.

The first bit plane generator 1830a and the second bit plane generator 1830b may generate bit planes with the data of the same bit position of each pixel value for the pixels provided via the channel splitter 1810. The bit planes generated via the first bit plane generator 1830a and the second bit plane generator 1830b may be encoded via the bit plane encoder 1840.

According to various embodiments, the bit plane encoder 1840 may be configured of a run-length encoder, and the run-length encoder may include a check-run unit and a binarization unit. The binarization unit may perform binarization by referring to the run-length value input from the check-run unit and the index indicating the method to be used for binarization on the corresponding bit plane.

Figure 19:
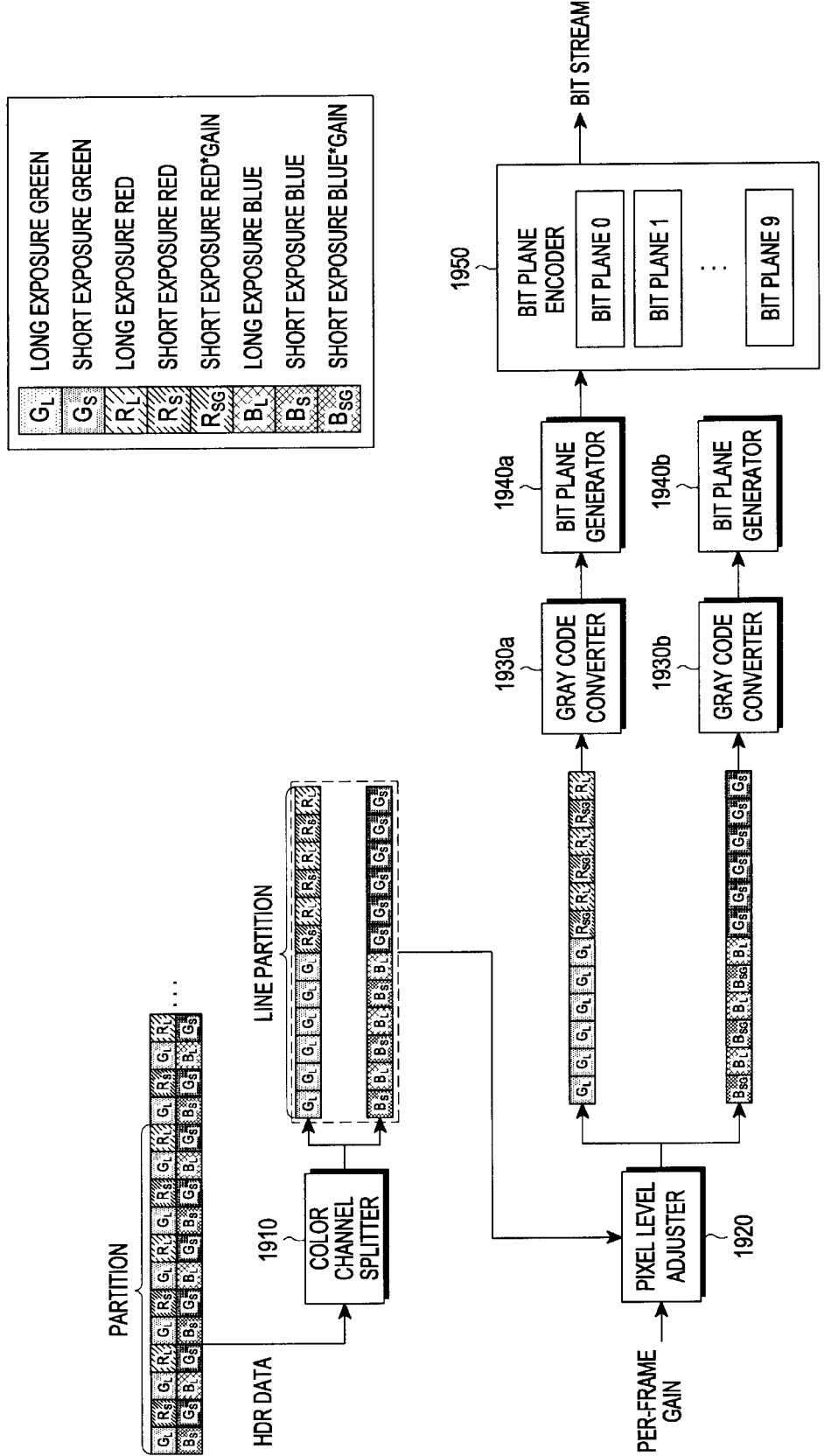
FIG. 19 is a block diagram illustrating a detailed structure of an electronic device of encoding HDR image data according to various embodiments.

FIG. 19 is a block diagram illustrating a detailed structure of an electronic device of transmitting HDR image data according to various embodiments. Referring to FIG. 19, according to various embodiments, an electronic device (e.g., the image sensor module 110 of FIG. 1 or the compression module 211 of FIG. 2) transmitting HDR image data may include at least one of a color channel splitter 1910, a pixel level adjuster 1920, gray code converters 1930a and 1930b, bit plane generators 1940a and 1940b, or a bit plane encoder 1950.

According to various embodiments, the HDR image data may be Bayer image data as shown. According to various embodiments, the plurality of pixels constituting the HDR image data may be divided into long exposure pixels (denoted by subscript L in the drawings) which have a relatively long exposure and short exposure pixels (denoted by subscript S in the drawings) which have a relatively short exposure.

The color channel splitter 1910 may divide, per line, pixels input per partition through two lines, split per color for each line, and perform reconstruction. For example, the pixels constituting the Bayer image data are divided into $G_L$, $R_S$, and $R_L$ for the first line and are reconstructed, and the pixels are divided into $B_S$, $B_L$, and $G_S$ in the second line and are reconstructed.

The color channel splitter 1910 may divide the pixels constituting the HDR image data per color. For example, since the HDR image data output from the image sensor may have a different color set per adjacent pixel, the correlation between adjacent pixels may be lowered. According to various embodiments, the correlation between consecutive pieces of data may be increased by dividing the pixels into channels of the same color via the channel splitter 1910.

According to various embodiments, the data of the first line pixels reconstructed via the color channel splitter 1910 may be input to the pixel level adjuster 1920. According to various embodiments, the pixel level adjuster 1920 may readjust the exposure for each pixel constituting the HDR image data. For example, for the HDR image data constituted of long exposure pixels and short exposure pixels as shown, a ratio of the exposure of the long exposure pixels to the exposure of the short exposure pixels may be determined as a fixed value in one frame.

The pixel level adjuster 1920 may readjust the short exposure pixels and the long exposure pixels to have similar exposure levels via the process of multiplying, per line, each pixel set to have a short exposure by the gain corresponding to the exposure ratio. The correlation between the long exposure pixel and short exposure pixel adjacent to each other may be increased by pixel level readjustment by the pixel level adjuster 1920. If the correlation between the long exposure pixel and short exposure pixel adjacent to each other rises, compression efficiency may be raised by generating the bit plane with the long exposure pixel and short exposure pixel adjacent to each other and performing encoding.

According to various embodiments, the data of pixels for which the exposure level has been readjusted per line via the pixel level adjuster 1920 may be provided to the gray code converters 1930a and 1930b. For example, the data of the first line pixels may be provided to the first gray code converter 1920a and the first bit plane generator 1930a, and the data of the second line pixels may be provided to the second gray code converter 1920b and the second bit plane generator 1930b.

The bit plane generators 1940a and 1940b may generate the bit plane with the data of the same bit position of each pixel value for the pixels provided via the pixel level adjuster 1920. The bit planes generated via the bit plane generators 1940a and 1940b may be encoded via the bit plane encoder 1950.

The bit plane encoder 1950 may be configured of a run-length encoder, and the run-length encoder may include a check-run unit and a binarization unit. The binarization unit may perform binarization by referring to the run-length value input from the check-run unit and the index indicating the method to be used for binarization on the corresponding bit plane.

Figure 20:
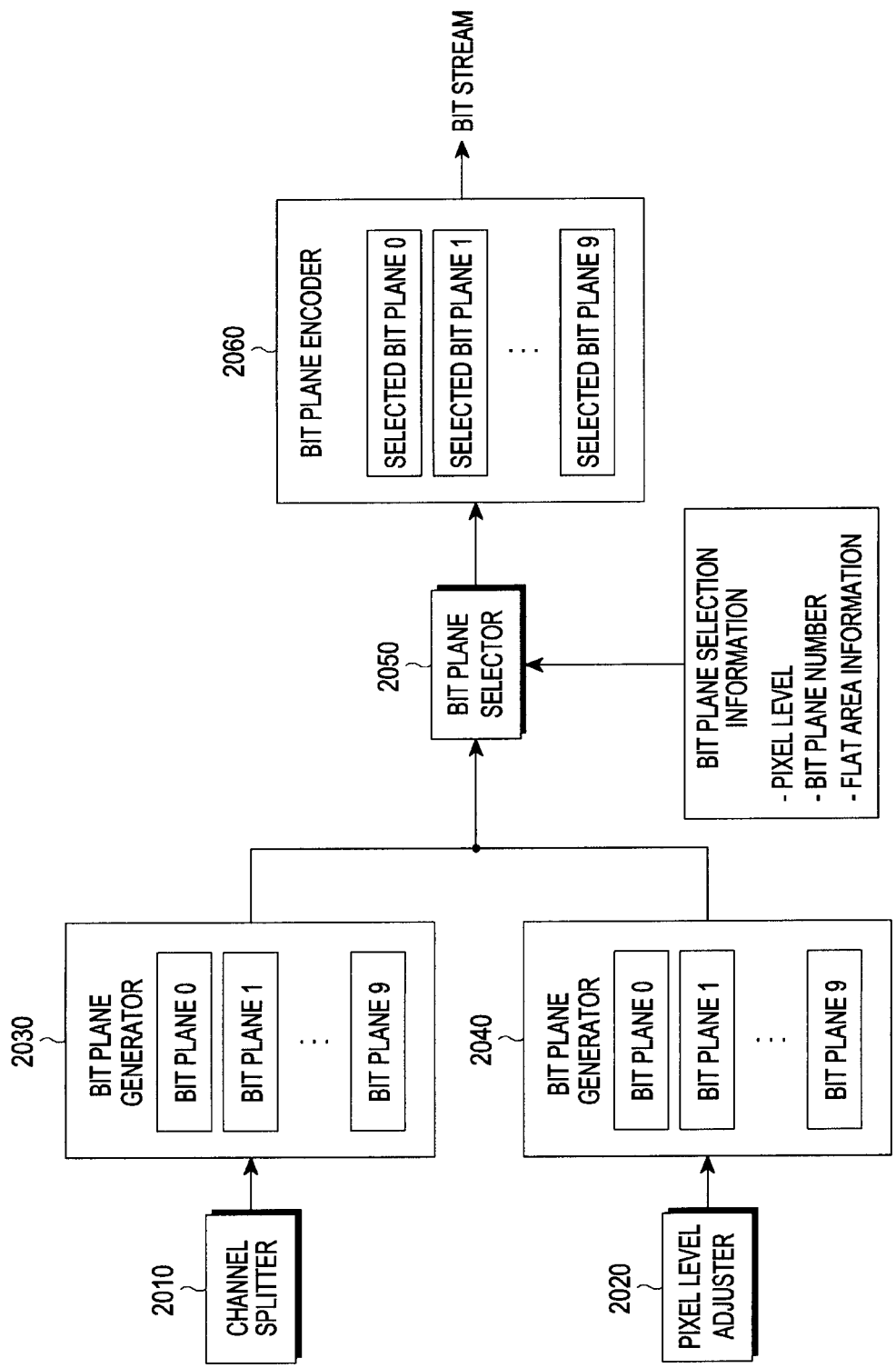
FIG. 20 is a block diagram illustrating a detailed structure of an electronic device of encoding HDR image data according to various embodiments.

FIG. 20 is a block diagram illustrating a detailed structure of an electronic device of transmitting HDR image data according to various embodiments. Referring to FIG. 20, according to various embodiments, an electronic device (e.g., the image sensor module 110 of FIG. 1 or the compression module 211 of FIG. 2) transmitting HDR image data may include at least one of a channel splitter 2010, a pixel level adjuster 2020, a first bit plane generator 2030, a second bit plane generator 2040, a bit plane selector 2050, or a bit plane encoder 2060.

According to various embodiments, the HDR image data may be Bayer image data. In various embodiments described below, Bayer image data is described as an example of the HDR image data for aiding in understanding the present invention. However, according to various embodiments, the type of the HDR image data is not limited to Bayer image data but may rather include various types of image data (e.g., Foveon image data).

The channel splitter 2010 may divide, per color, the pixels constituting the HDR image data and reconstruct the same. For example, since each of the pixels constituting the Bayer image data has a color R, $G_1$, $G_2$, or B, the channel splitter 2010 may divide, per color, the pixels constituting the HDR image data. For example, since the Bayer image data output from the image sensor has only one color channel per pixel, the correlation between the adjacent pixels may be lowered. According to various embodiments, the correlation between consecutive pieces of data may be increased by dividing the pixels into channels of the same color via the channel splitter 2010.

According to various embodiments, the channel splitter 2010 may divide, per exposure, the pixels constituting the HDR image data and reconstruct the same. For example, the pixels constituting the HDR image may be constituted of long exposure pixels of $R_L$, $G_L$, and $B_L$ and short exposure pixels of $R_S$, $G_S$, and $B_S$. According to various embodiments, the channel splitter 2010 may divide the pixels constituting the HDR image data into the long exposure pixels and the short exposure pixels and reconstruct the same.

According to various embodiments, the channel splitter 2010 may reconstruct the pixels constituting the HDR image data considering both the colors and exposures.

According to various embodiments, data of the first exposure (e.g., long exposure) pixels and data of the second exposure (e.g., short exposure) pixels reconstructed via the channel splitter 2010 may be separately provided to the first bit plane generators 2030.

The first bit plane generators 2030 may generate bit planes with the data of the same bit position of each pixel value for the first exposure pixels and the second exposure pixels, respectively, provided via the channel splitter 2010. More specifically, according to various embodiments, the first bit plane generator 2030 may generate a plurality of first bit planes constituted based on the bit position of each pixel value for the first exposure (e.g., long exposure) pixels corresponding to at least part of the HDR image data and a plurality of second bit planes constituted based on the bit position of each pixel value for the second exposure (e.g., short exposure) pixels.

According to various embodiments, the pixel level adjuster 2020 may readjust the exposure for each pixel constituting the HDR image data. For example, for the HDR image data constituted of long exposure pixels and short exposure pixels as shown, a ratio of the exposure of the long exposure pixels to the exposure of the short exposure pixels may be determined as a fixed value in one frame.

The pixel level adjuster 2020 may readjust the short exposure pixels and the long exposure pixels to have similar exposure levels via the process of multiplying each pixel set to have a short exposure by the gain corresponding to the exposure ratio. The correlation between the long exposure pixel and short exposure pixel adjacent to each other may be increased by pixel level readjustment by the pixel level adjuster 2020. If the correlation between the long exposure pixel and short exposure pixel adjacent to each other rises, compression efficiency may be raised by generating the bit plane with the long exposure pixel and short exposure pixel adjacent to each other and performing encoding.

According to various embodiments, the data of pixels for which the exposure level has been readjusted via the pixel level adjuster 2020 may be provided to the second bit plane generator 2040. The second bit plane generator 2040 may generate the bit plane with the data of the same bit position of each pixel value for the pixels provided via the pixel level adjuster 2020.

The bit plane selector 2050 may select the high-compression efficiency bit plane among the bit planes generated via the first bit plane generator 2030 and the second bit plane generator 2040 based on per-bit plane characteristics and information obtainable from the HDR image data (e.g., pixel level information, bit plane number, and flat area information).

According to various embodiments, the bit plane selector 2050 may select the high-compression efficiency bit plane among the bit planes generated via the first bit plane generator 2030 and the second bit plane generator 2040 on a per-frame basis or a per-preset partition basis for the raw image data. For example, the bit plane selector 2050 may select bit planes generated via the first bit plane generator 2030 for a first frame in the raw image data and may select bit planes generated via the second bit plane generator 2040 for a second frame. According to various embodiments, the bit plane selector 2050 may select bit planes generated via the first bit plane generator 2030 for a first partition in the raw image data and may select bit planes generated via the second bit plane generator 2040 for a second partition.

The bit plane encoder 2060 may encode each bit plane selected via the bit plane selector 2050. The bit plane encoder 2060 may be configured of a run-length encoder, and the run-length encoder may include a check-run unit and a binarization unit.

The binarization unit may perform binarization by referring to the run-length value input from the check-run unit and the index indicating the method to be used for binarization on the corresponding bit plane.

Figure 21:
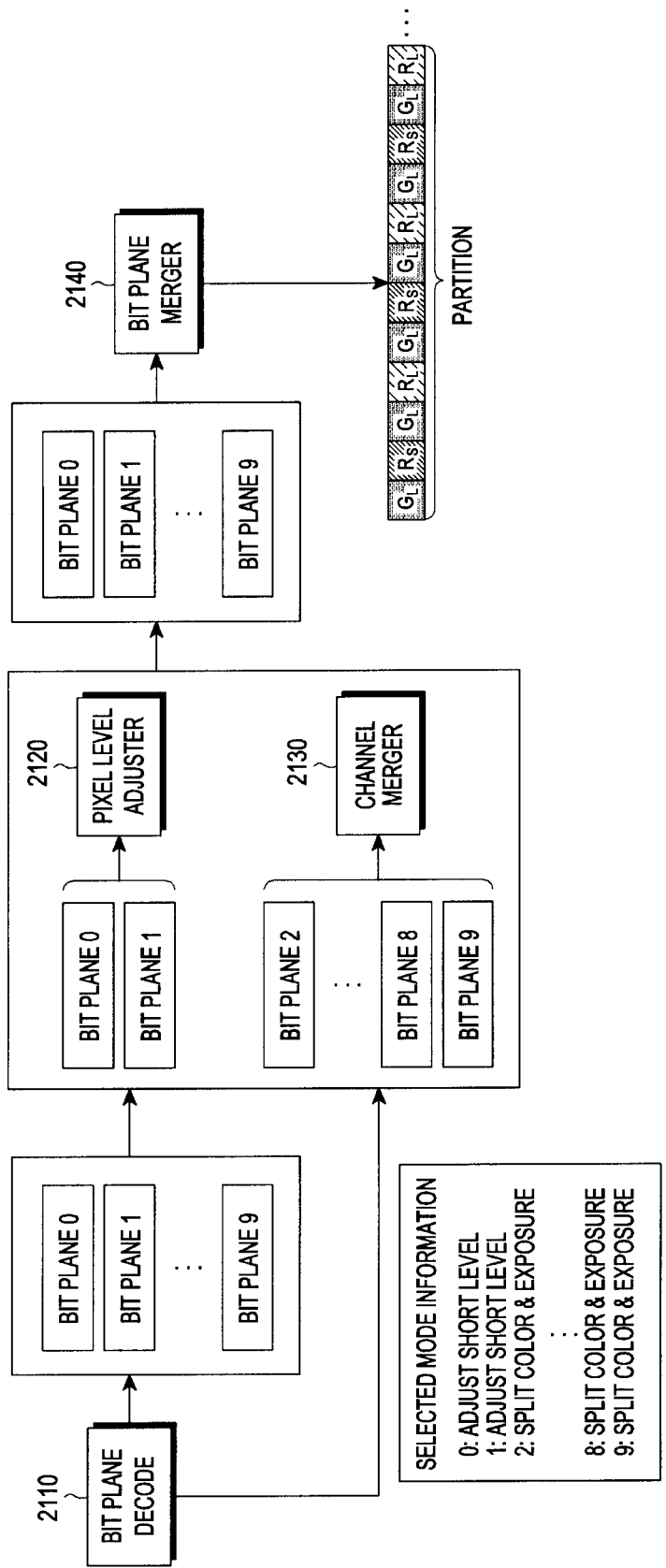
FIG. 21 is a block diagram illustrating a detailed structure of an electronic device of decoding received HDR image data according to various embodiments.

FIG. 21 is a block diagram illustrating a detailed structure of an electronic device of reconstructing received HDR image data according to various embodiments. Referring to FIG. 21, according to various embodiments, an electronic device (e.g., the processor 120 of FIG. 1 or the decompression module 221 of FIG. 2) reconstructing or decoding image data may include at least one of a bit plane decoder 2110, a pixel level adjuster 2120, a channel merger 2130, or a bit plane merger 2140. According to various embodiments, the blocks of FIG. 21 may process data in reverse order corresponding to the processing scheme by the blocks of FIG. 20.

According to various embodiments, when a bit stream including compressed or encoded data is received, a parser may identify the header information of the received bit stream and divide the bit stream per exposure or per color channel and process the bit stream. According to various embodiments, the parser may analyze the received bit stream, thereby identifying at least one bit stream encoded among a plurality of bit streams. The at least one encoded bit stream may be decoded by the bit plane decoder 2110.

Each of the bit plane separated and decoded according to each exposure among the plurality of bit planes included in the received bit stream and the bit plane for which the exposure level of the short exposure pixels has been readjusted may be input to the channel merger 2130 or the pixel level adjuster 2120.

For example, bit planes separated and decoded according to each exposure among the plurality of bit planes included in the received bit stream may be provided to the channel merger 2130, and bit planes for which the exposure level of the short exposure pixels has been readjusted may be provided to the pixel level adjuster 2120.

The channel merger 2130 may reconstruct the pixel data before converted into the bit plane from each bit plane decompressed via the bit plane decoder 2110. According to various embodiments, since the pixel data converted from the bit plane data is gray code type data, a binary converter may convert the gray code type pixel data into pixel data of binary code.

The pixel level adjuster 2120 may readjust the exposure for each pixel corresponding to the bit planes for which the exposure level of the short exposure pixels has been readjusted. For example, for the HDR image data constituted of long exposure pixels and short exposure pixels as shown, a ratio of the exposure of the long exposure pixels to the exposure of the short exposure pixels may be determined as a fixed value in one frame.

The pixel level adjuster 2120 may readjust into the exposure level of the short exposure pixels in the original HDR image data by getting through the process of dividing the gain corresponding to the exposure ratio for each pixel set to have a short exposure. According to various embodiments, as the exposure level of each pixel is readjusted via the pixel level adjuster 2120, the original HDR image data may be reconstructed.

The bit plane merger 2140 may merge the pixels merged via the channel merger 2130 and the bit planes for which the exposure level has been readjusted by the pixel level adjuster 2120, thereby reconstructing the original HDR image data. According to various embodiments, the bit plane merger 2140 may reconstruct the pixels per partition.

Figure 22A:
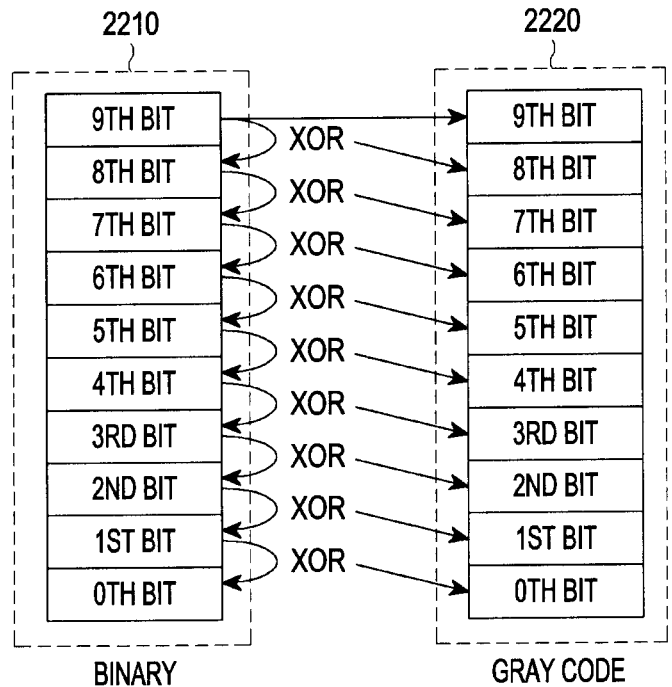
FIG. 22A is a view illustrating an example of converting binary data into gray code data according to various embodiments.

FIG. 22A is a view illustrating an example of converting binary data into gray code data according to various embodiments. Referring to FIG. 22A, according to various embodiments, for the pixel data split per channel, the binary code data 2210 may be converted into gray code data 2220. Although FIG. 22A illustrates an example in which each pixel is constituted of a total of 10 bits from the zeroth bit to the ninth bit, various embodiments are not limited thereto.

Referring to FIG. 22A, to convert the binary code data 2210 into the gray code data 2220, the other bits (e.g., the eight bit to the zeroth bit) than the MSB bit (e.g., the ninth bit) may be subjected to exclusive-OR operation with their respective higher bits (e.g., the ninth bit to the first bit).

According to various embodiments, the result of the exclusive-OR operation may be transferred to the bit plane encoder for compression and, if the size of the compressed data is larger than the pre-compression input data, it may be stored in the raw image data buffer so that the pre-compression data (e.g., the bit planes of the raw image data) may be transmitted.

Figure 22B:
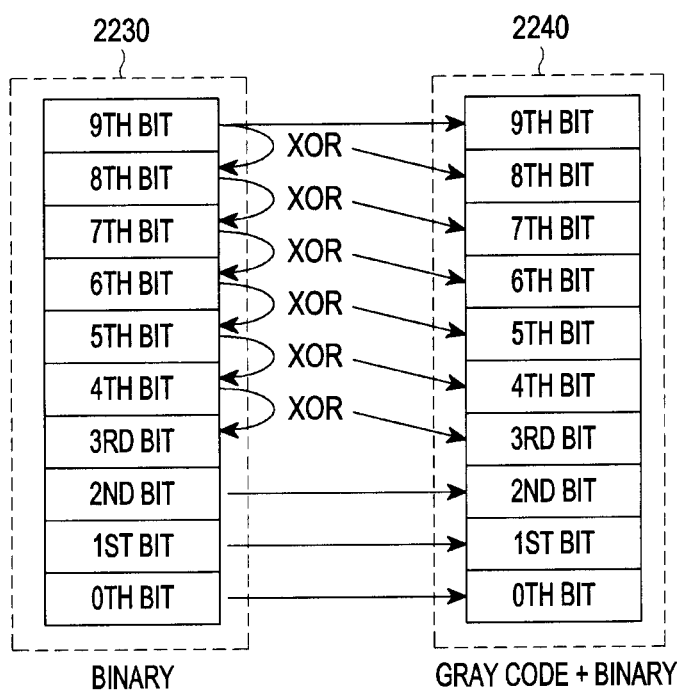
FIG. 22B is a view illustrating an example of converting binary data into gray code data according to various embodiments.

FIG. 22B is a view illustrating an example of converting binary data into gray code data according to various embodiments. Referring to FIG. 22B, according to various embodiments, for the pixel data split per channel, the binary code data 2230 may be converted into gray code data 2240. Although FIG. 22B illustrates an example in which each pixel is constituted of a total of 10 bits from the zeroth bit to the ninth bit, various embodiments are not limited thereto.

Referring to FIG. 22B, to convert the binary code data 2230 into the gray code data 2240, at least some of at least some bits (e.g., the eighth bit to the third bit) of the other bits than the MSB bit (e.g., the ninth bit) may be subjected to exclusive-OR operation with their respective higher bits (e.g., the ninth bit to the fourth bit).

According to various embodiments, such an occasion may arise where the bit plane encoder may produce no compression effect via encoding after gray code conversion by the influence of noise in a specific bit plane and under. Referring to FIG. 22B, according to various embodiments, gray code conversion may not be performed on a specific bit and under (e.g., the second bit and its lower bits). If conversion is performed only on some bits as shown in FIG. 22B, a merged form of gray code and binary code may be configured.

According to various embodiments, the result of the gray code conversion may be transferred to the bit plane encoder for compression and, if the size of the compressed data is larger than the pre-compression input data, it may be stored in the raw image data buffer so that the pre-compression data (e.g., the bit planes of the raw image data) may be transmitted.

Figure 23:
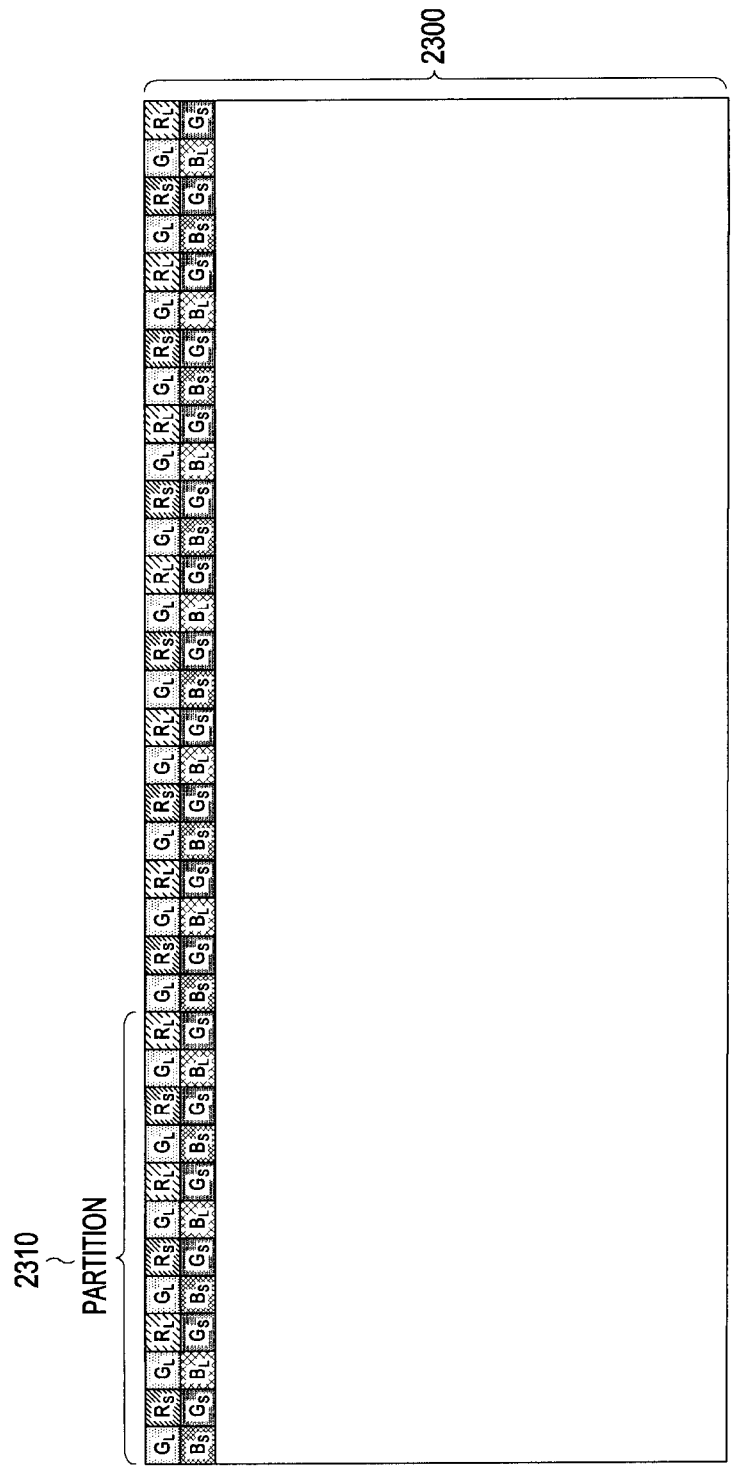
FIG. 23 is a view illustrating an example of partitioning raw image data according to various embodiments.

FIG. 23 is a view illustrating an example of partitioning raw image data according to various embodiments. According to various embodiments, image data compression may be performed on all the pixels. As shown in FIG. 23, the entire image data 2300 (e.g., an image frame) may be divided into a plurality of partitions 2310 and, after bit planes are configured per partition, compression may be performed per bit plane.

For example, referring to FIG. 23, if four pixels are simultaneously input per clock, 6 R, $G_1$, $G_2$, and B pixels may be configured into one partition 2310, thereby configuring a bit plane. For example, according to various embodiments, the bit plane corresponding to each bit position per color channel may be configured of six-bit data depending on the number of pixels which is six. According to various embodiments, if the pixel value of each pixel is configured of 10 bits as shown in FIGS. 22A and 22B, and six clocks proceed for processing one partition 2310, then 10 bit planes each configured of six-bit data may be generated for the R color channel, 10 bit planes each configured of six-bit data may be generated for the $G_1$ color channel, 10 bit planes each configured of six-bit data may be generated for the $G_2$ color channel, and 10 bit planes each configured of six-bit data may be generated for the B color channel.

According to various embodiments, the partition may be a unit for compression, and the partition may be constituted of a plurality of pixels. According to various embodiments, the number of pixels configured per partition may be the same or variable for a whole image. According to various embodiments, information about the number of pixels configured per partition may be added, as header information, when the packet generator generates packet data.

Figure 24:
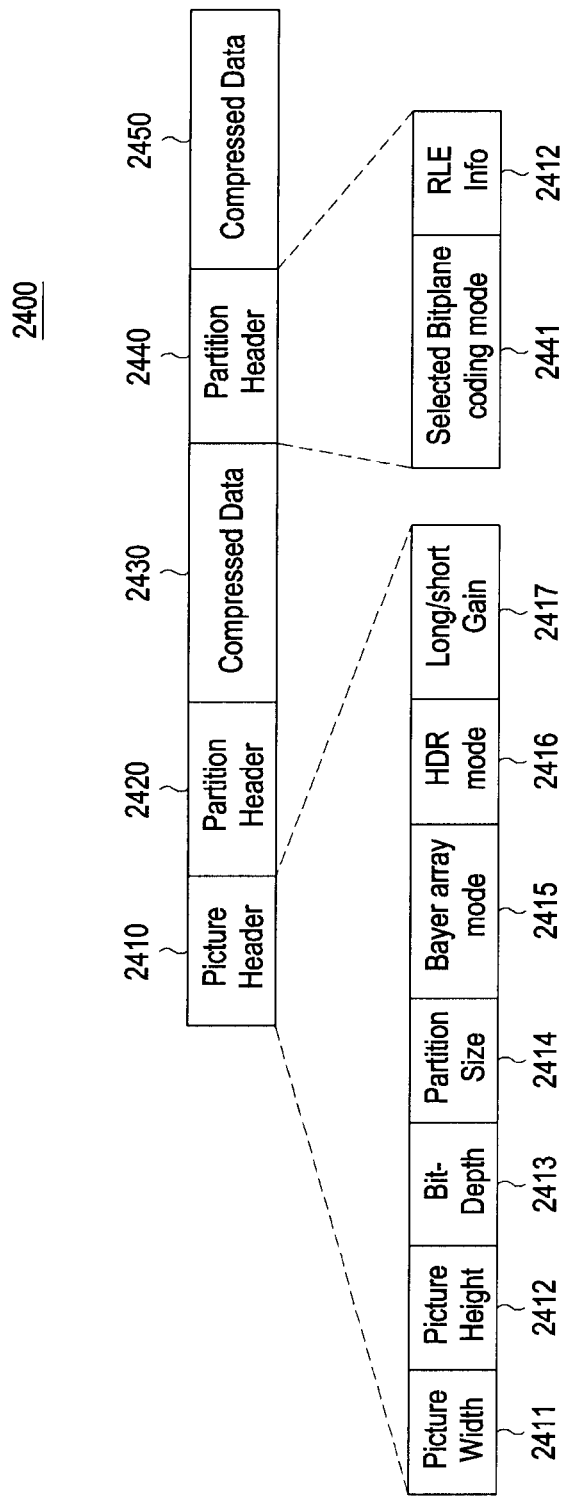
FIG. 24 is a view illustrating an example configuration of a data field of a bit stream including decoded data according to various embodiments.

FIG. 24 is a view illustrating an example configuration of a data field of a bit stream including compression data generated according to various embodiments. Referring to FIG. 24, according to various embodiments, packet data 2400 may be configured as shown.

According to various embodiments, one piece of packet data 2400 may include an image header field 2410, at least one partition header field 2420 and 2440, or at least one compression data field 2430 and 2450. According to various embodiments, the partition header fields 2420 and 2440 and the compression data fields 2430 and 2450 may be configured as many as the number of partitions constituting the image data.

The image header field 2410 may include the overall information for the image data to be transmitted. According to various embodiments, the image header field 2410 may include at least one piece of data of the image width 2411, image height 2412, bit depth 2413, partition size 2414, Bayer array mode 2415, HDR mode 2416, or gain 2417 of short exposure relative to long exposure.

The partition header field 2440 may include information related to each partition and, according to various embodiments, the partition header field 2440 may include at least one piece of data of the coding mode 2441 of a selected bit plane or run-length encoding (RLE) information 2412.

Figure 25:
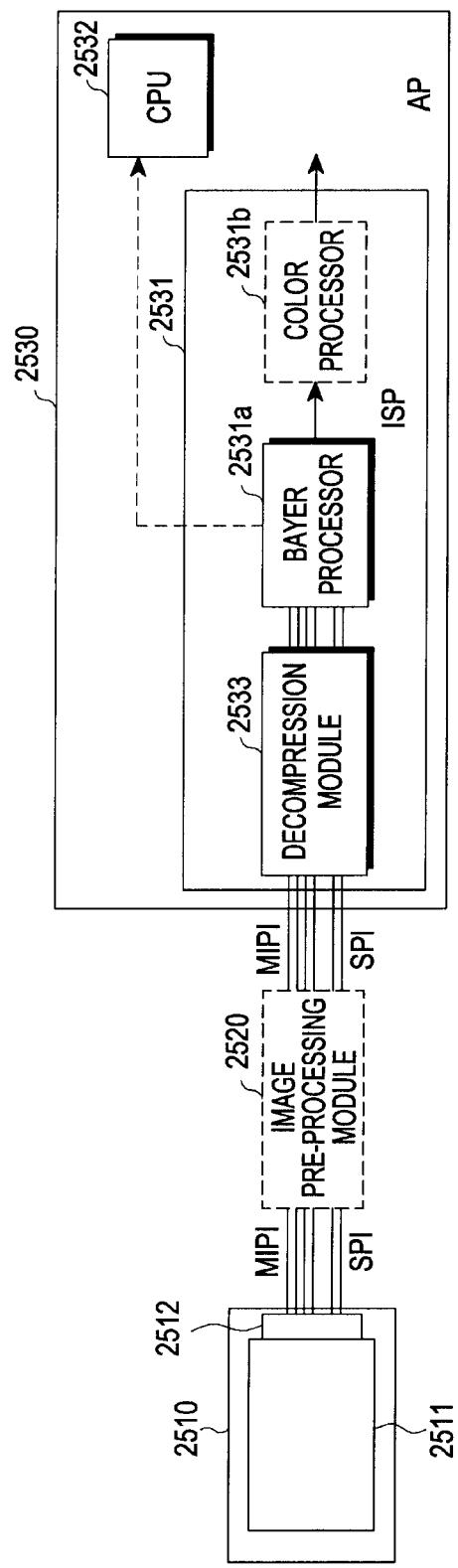
FIG. 25 is a block diagram illustrating a detailed structure of an electronic device capable of compressing and transmitting HDR image data according to an embodiment.

FIG. 25 is a block diagram illustrating a detailed structure of an electronic device capable of compressing and transmitting HDR image data according to an embodiment. Referring to FIG. 25, according to various embodiments, an electronic device may include an image sensor module 2510 (e.g., the image sensor module 110 of FIG. 1), an image pre-processing module 2520 (e.g., a companion chip), and an application processor (AP) 2530 (e.g., the processor 120 of FIG. 1). The image processor may be implemented to directly connect from the image sensor module 2510 to the application processor 2530 without the image pre-processing module 2520.

The image sensor module 2510 may be a module of image sensing and may transmit each sensed pixel value through an MIPI line to the image pre-processing module 2520 or the application processor 2530. The image sensor module 2510 may transmit or receive various control signals through an SPI. The image sensor module 2510 may include an image sensor 2511 (e.g., a CMOS sensor) (e.g., the image sensor 111 of FIG. 1) and a control circuit 2512 (e.g., the control circuit 112 of FIG. 1).

The image pre-processing module 2520 may be added to support a particular function of the image sensor. For example, the image pre-processing module 2520 may perform pre-processing for enhancing image quality. According to various embodiments, at least part of the image compression function of the above-described control circuit 112 of FIG. 1 may be included and configured in the control circuit 2512 or the image pre-processing module 2520.

The application processor 2530 may include an image signal processor (ISP) 2531 and a main processor (central processing unit (CPU)) 2532. The image signal processor 2531 may include a Bayer processor 2531a, a color processor 2531b (Luma/Color), and a decompression module 2533 (e.g., the decompression module 221 of FIG. 2).

Figure 26:
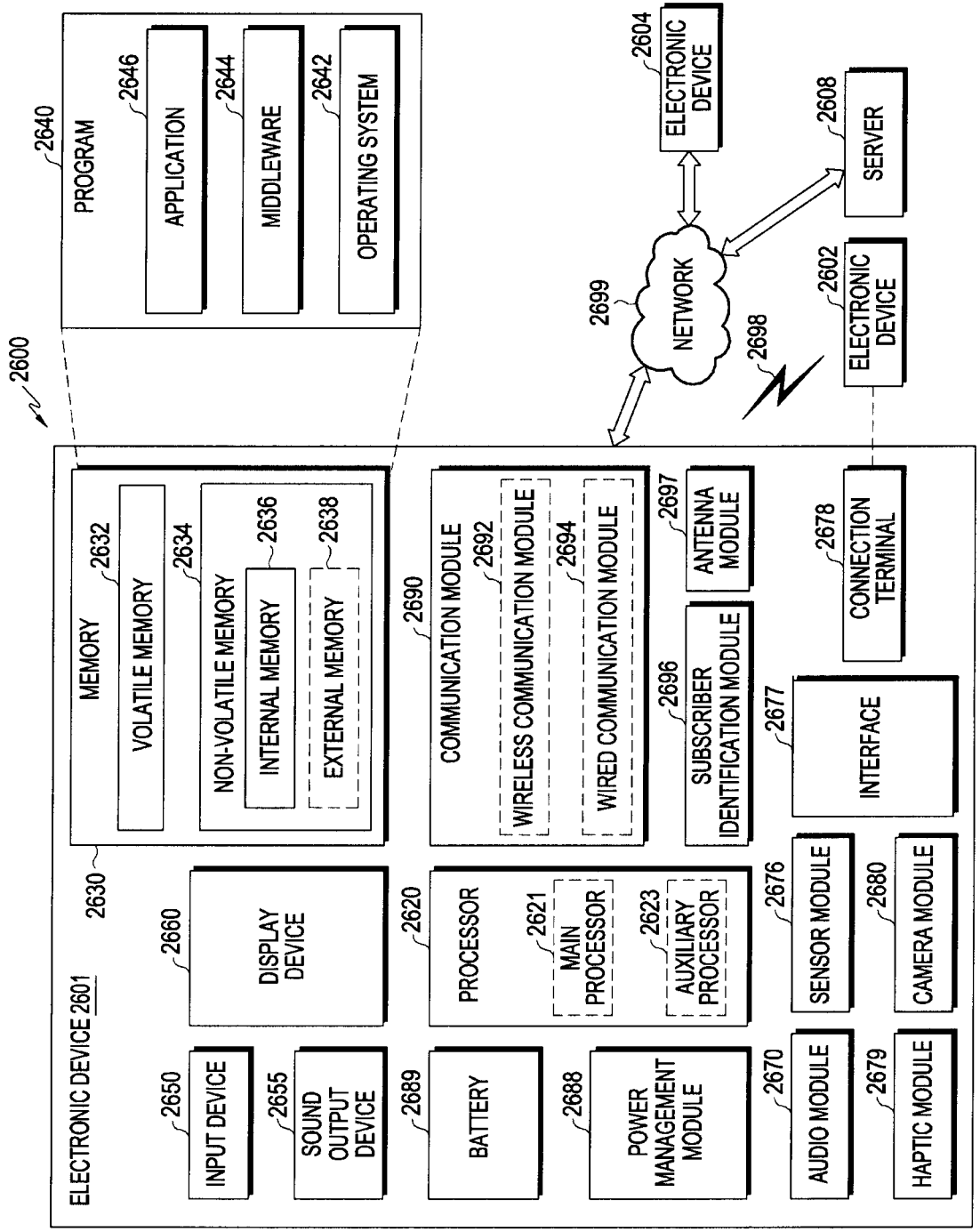
FIG. 26 is a view illustrating an electronic device capable of compressing and transmitting HDR image data in a network environment according to an embodiment.

FIG. 26 is a block diagram illustrating an electronic device 2601 capable of compressing and transmitting HDR image data in a network environment 2600 according to various embodiments. Referring to FIG. 26, the electronic device 2601 (e.g., the image sensor module 110 or processor 120 of FIG. 1 or the first device 210 or second device 220 of FIG. 2) in the network environment 2600 may communicate with an electronic device 2602 via a first network 2698 (e.g., a short-range wireless communication network) or an electronic device 2604 or a server 2608 via a second network 2699 (e.g., a long-range wireless communication network). According to an embodiment, the electronic device 2601 may communicate with the electronic device 2604 via the server 2608. According to an embodiment, the electronic device 2601 may include a processor 2620, a memory 2630, an input device 2650, a sound output device 2655, a display device 2660, an audio module 2670, a sensor module 2676, an interface 2677, a haptic module 2679, a camera module 2680, a power management module 2688, a battery 2689, a communication module 2690, a subscriber identification module 2696, and an antenna module 2697. In some embodiments, the electronic device 2601 may exclude at least one of the components or may add another component. In some embodiments, some components may be implemented to be integrated together, e.g., as if the sensor module 2676 (e.g., a fingerprint sensor, an iris sensor, or an illuminance sensor) is embedded in the display device 2660 (e.g., a display).

The processor 2620 (e.g., the processor 120 of FIG. 1 or the decompression module 221 of FIG. 2) may drive, e.g., software (e.g., a program 2640) to control at least one other component (e.g., a hardware or software component) of the electronic device 2601 connected with the processor 2620 and may process or compute various data. The processor 2620 may load and process an instruction or data received from another component (e.g., the sensor module 2676 or the communication module 2690) on a volatile memory 2632, and the processor 120 may store resultant data in a non-volatile memory 2634. According to an embodiment, the processor 2620 may include a main processor 2621 (e.g., a central processing unit (CPU) or an application processor), and additionally or alternatively, an auxiliary processor 2623 (e.g., a graphics processing unit (GPU), an image signal processor, a sensor hub processor, or a communication processor) that is operated independently from the main processor 2621 and that consumes less power than the main processor 121 or is specified for a designated function. Here, the auxiliary processor 2623 may be operated separately from or embedded in the main processor 2621.

In such case, the auxiliary processor 2623 may control at least some of functions or states related to at least one (e.g., the display device 2660, the sensor module 2676, or the communication module 2690) of the components of the electronic device 2601, instead of the main processor 2621 while the main processor 2621 is in an inactive (e.g., sleep) state or along with the main processor 2621 while the main processor 2621 is an active state (e.g., performing an application). According to an embodiment, the auxiliary processor 2623 (e.g., an image signal processor or a communication processor) may be implemented as part of another component (e.g., the camera module 2680 or the communication module 2690) functionally related to the auxiliary processor 123. The memory 2630 may store various data used by at least one component (e.g., the processor 2620 or sensor module 2676) of the electronic device 2601, e.g., software (e.g., the program 2640) and input data or output data for a command related to the software. The memory 2630 may include the volatile memory 2632 or the non-volatile memory 2634.

The program 2640, as software stored in the memory 2630, may include, e.g., an operating system (OS) 2642, middleware 2644, or an application 2646.

The input device 2650 may be a device for receiving a command or data, which is to be used for a component (e.g., the processor 2620) of the electronic device 2601, from an outside (e.g., a user) of the electronic device 2601. The input device 2650 may include, e.g., a microphone, a mouse, or a keyboard.

The sound output device 2655 may be a device for outputting sound signals to the outside of the electronic device 2601. The sound output device 2655 may include, e.g., a speaker which is used for general purposes, such as playing multimedia or recordings, and a receiver used for call receiving purposes only. According to an embodiment, the receiver may be formed integrally or separately from the speaker.

The display 2660 may be a device for visually providing information to a user of the electronic device 2601. The display device 2660 may include, e.g., a display, a hologram device, or a projector and a control circuit for controlling the display, hologram device, or projector. According to an embodiment, the display device 2660 may include touch circuitry or a pressure sensor capable of measuring the strength of a pressure for a touch.

The audio module 2670 may convert a sound into an electrical signal and vice versa. According to an embodiment, the audio module 2670 may obtain the sound via the input device 2650, or output the sound via the sound output device 2655 or a headphone of an external electronic device (e.g., an electronic device 2602) wiredly or wirelessly coupled with the electronic device 2601.

The sensor module 2676 may generate an electrical signal or data value corresponding to an internal operating state (e.g., power or temperature) or external environmental state of the electronic device 2601. The sensor module 2676 may include, e.g., a gesture sensor, a gyro sensor, an atmospheric pressure sensor, a magnetic sensor, an acceleration sensor, a grip sensor, a proximity sensor, a color sensor, an infrared (IR) sensor, a bio sensor, a temperature sensor, a humidity sensor, or an illuminance sensor.

The interface 2677 may support a designated protocol enabling a wired or wireless connection with an external electronic device (e.g., the electronic device 2602). According to an embodiment, the interface 2677 may include a high definition multimedia interface (HDMI), a universal serial bus (USB) interface, a secure digital (SD) card interface, or an audio interface.

A connecting terminal 2678 may include a connector, e.g., a HDMI connector, a USB connector, an SD card connector, or an audio connector (e.g., a headphone connector), which is able to physically connect the electronic device 2601 with an external electronic device (e.g., the electronic device 2602).

The haptic module 2679 may convert an electrical signal into a mechanical stimulus (e.g., a vibration or motion) or electrical stimulus which may be recognized by a user via his or her tactile sensation or kinesthetic sensation. The haptic module 2679 may include, e.g., a motor, a piezoelectric element, or an electric stimulator.

The camera module 2680 (e.g., the image sensor module 110 of FIG. 1) may capture a still image or moving images. According to an embodiment, the camera module 2680 may include one or more lenses, an image sensor (e.g., the image sensor 111 of FIG. 1), an image signal processor (e.g., the processor 120 of FIG. 1), or a flash.

The power management module 2688 may be a module for managing power supplied to the electronic device 2601. The power management module 188 may be configured as at least part of, e.g., a power management integrated circuit (PMIC).

The battery 2689 may be a device for supplying power to at least one component of the electronic device 2601. The battery 189 may include, e.g., a primary cell which is not rechargeable, a secondary cell which is rechargeable, or a fuel cell.

The communication module 2690 may support establishing a wired or wireless communication channel between the electronic device 2601 and an external electronic device (e.g., the electronic device 2602, the electronic device 2604, or the server 2608) and performing communication through the established communication channel. The communication module 2690 may include one or more communication processors that are operated independently from the processor 2620 (e.g., an application processor) and supports wired or wireless communication. According to an embodiment, the communication module 2690 may include a wireless communication module 2692 (e.g., a cellular communication module, a short-range wireless communication module, or a global navigation satellite system (GNSS) communication module) or a wired communication module 2694 (e.g., a local area network (LAN) communication module or a power line communication (PLC) module). A corresponding one of the wireless communication module 192 and the wired communication module 194 may be used to communicate with an external electronic device through a first network 2698 (e.g., a short-range communication network, such as Bluetooth, wireless-fidelity (Wi-Fi) direct, or infrared data association (IrDA)) or a second network 2699 (e.g., a long-range communication network, such as a cellular network, the Internet, or a communication network (e.g., LAN or wide area network (WAN)). The above-enumerated types of communication modules 2690 may be implemented in a single chip or individually in separate chips.

According to an embodiment, the wireless communication module 2692 may differentiate and authenticate the electronic device 2601 in the communication network using user information stored in the subscriber identification module 2696.

The antenna module 2697 may include one or more antennas for transmitting or receiving a signal or power to/from an outside. According to an embodiment, the communication module 2690 (e.g., the wireless communication module 2692) may transmit or receive a signal to/from an external electronic device through an antenna appropriate for a communication scheme.

Some of the above-described components may be connected together through an inter-peripheral communication scheme (e.g., a bus, general purpose input/output (GPIO), serial peripheral interface (SPI), or mobile industry processor interface (MIPI)), communicating signals (e.g., instructions or data) therebetween.

According to an embodiment, instructions or data may be transmitted or received between the electronic device 2601 and the external electronic device 2604 via the server 2608 coupled with the second network 2699. Each of the electronic devices 2602 and 2204 may be a device of a same type as, or a different type, from the electronic device 2601. According to an embodiment, all or some of operations executed on the electronic device 2601 may be run on one or more other external electronic devices. According to an embodiment, when the electronic device 2601 should perform a certain function or service automatically or at a request, the electronic device 2601, instead of, or in addition to, executing the function or service on its own, may request an external electronic device to perform at least some functions associated therewith. The external electronic device (e.g., electronic devices 102 and 104 or server 106) may execute the requested functions or additional functions and transfer a result of the execution to the electronic device 2601. The electronic device 2601 may provide a requested function or service by processing the received result as it is or additionally. To that end, a cloud computing, distributed computing, or client-server computing technology may be used, for example.

Figure 27:
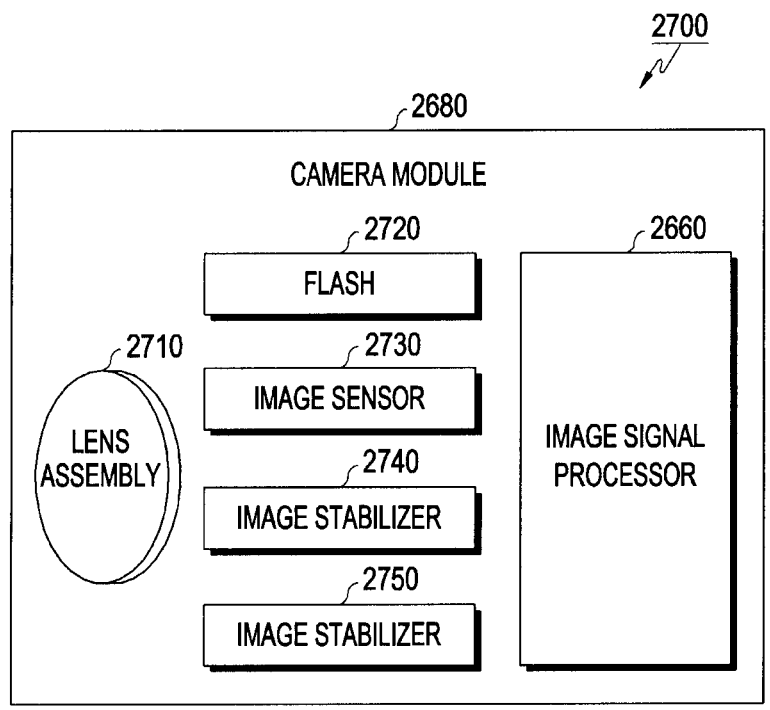
FIG. 27 is a block diagram illustrating a detailed structure of a camera module capable of compressing and transmitting HDR image data according to an embodiment.

FIG. 27 is a block diagram 2700 illustrating a camera module 2680 capable of compressing and transmitting HDR image data according to various embodiments. Referring to FIG. 27, the camera module 2680 (e.g., the image sensor module 110 of FIG. 1) may include a lens assembly 2710, a flash 2730, an image sensor 2730 (e.g., the image sensor 111 of FIG. 1), an image stabilizer 2740, a memory 2750 (e.g., buffer memory) (e.g., the memory 113 of FIG. 1), or an image signal processor 2760 (e.g., the processor 120 of FIG. 1). The lens assembly 2710 may collect light emitted or reflected from an object whose image is to be taken. The lens assembly 2710 may include one or more lenses. According to an embodiment, the camera module 2680 may include a plurality of lens assemblies 2710. In this case, the camera module 2680 may be, e.g., a dual camera, a 360-degree camera, or a spherical camera. The plurality of lens assemblies 2710 may have the same lens attribute (e.g., view angle, focal length, auto-focusing, f number, or optical zoom), or at least one lens assembly may have at least one different lens attribute from another lens assembly. The lens assembly 2710 may include, for example, a wide-angle lens or a telephoto lens. The flash 2720 may emit light that is used to reinforce light from an object. The flash 2720 may include one or more light emitting diodes (LEDs) (e.g., a red-green-blue (RGB) LED, a white LED, an infrared (IR) LED, or an ultraviolet (UV) LED) or a xenon lamp.

The image sensor 2730 may obtain an image corresponding to an object by converting light transmitted from the object via the lens assembly 2710 into an electrical signal. According to an embodiment, the image sensor 2730 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 2730 may be implemented as, e.g., a charged coupled device (CCD) sensor or a complementary metal oxide semiconductor (CMOS) sensor.

The image stabilizer 2740 may move in a particular direction, or control (e.g., adjust the read-out timing of), the image sensor 2730 or at least one lens included in the lens assembly 2710 to at least partially compensate for a negative effect (e.g., image blurring) on a captured image, which is caused by the motion of the camera module 2680 or the electronic device 2601 including the camera module 2680, in response to the motion. According to an embodiment, the image stabilizer 2740 may be implemented as, e.g., an optical image stabilizer. The image stabilizer 2740 may sense such movement using a gyro sensor (not shown) or an acceleration sensor (not shown) disposed inside or outside the camera module 2680.

The memory 2750 may store, at least temporarily, at least part of an image obtained via the image sensor 2730 for a subsequent image processing task. For example, when image capturing is delayed due to shutter lag or multiple images are quickly captured, a raw image obtained (e.g., a high-resolution image) may be stored in the memory 2750, and its corresponding copy (e.g., a low-resolution image) may be previewed through the display device 2660. Thereafter, if a specified condition is met (e.g., by a user's input or system command), at least part of the raw image stored in the memory 2750 may be obtained and processed, for example, by the image signal processor 2760. According to an embodiment, the memory 2750 may be configured as at least part of the memory 2630 or as a separate memory that is operated independently from the memory 130.

The image signal processor 2760 may perform image processing (e.g., depth map generation, three-dimensional (3D) modeling, panorama generation, feature point extraction, image mixing, or image compensation (e.g., noise canceling, resolution adjustment, brightness adjustment, blurring, sharpening, or softening)) on an image obtained through the image sensor 2730 or an image stored in the memory 2750. Additionally or alternatively, the image signal processor 2760 may perform control (e.g., exposure time control or read-out timing control) with respect to at least one (e.g., the image sensor 2730) of the components included in the camera module 2680. An image processed by the image signal processor 2760 may be stored back in the memory 2750 for further processing, or may be provided to an external component (e.g., the memory 2630, the display device 2660, the electronic device 2602, the electronic device 2604, or the server 2608) outside the camera module 2680. According to an embodiment, the image signal processor 2760 may be configured as at least part of the processor 2620, or as a separate processor that is operated independently from the processor 2620. When the image signal processor 2760 is configured as a separate processor, images processed by the image signal processor 260 may be displayed through the display device 2660 as they are or after further processed by the processor 2620.

According to an embodiment, the electronic device 2601 may include two or more camera modules 2680 with different attributes or functions. In this case, at least one of the camera modules 2680 may be, e.g., a wide-angle camera or a front camera while at least one other camera module may be a telephoto camera or a rear camera.

Figure 28:
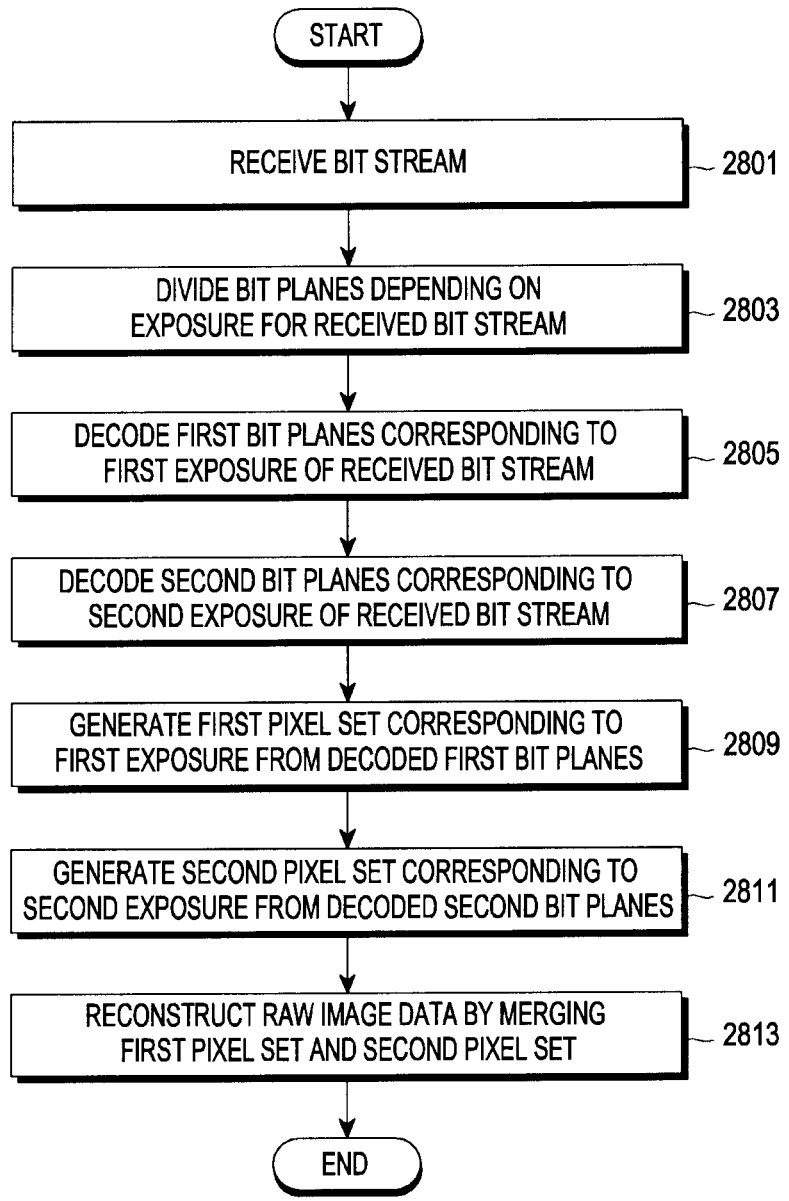
FIG. 28 is a flowchart illustrating a process of reconstructing, by an electronic device, transmitted HDR image data according to various embodiments.

FIG. 28 is a flowchart illustrating a process of reconstructing, by an electronic device, transmitted HDR image data according to various embodiments. Referring to FIG. 28, an electronic device (e.g., the processor 120 of FIG. 1 or the decompression module 221 of FIG. 2) may receive data transmitted from an image sensor module (e.g., the control circuit 112) in the form of a bit stream and reconstruct, decompress, or decode the received compression data, corresponding to the compression or encoding scheme.

In operation 2801, the electronic device may receive a bit stream including the encoded data and, in operation 2803, divide the received bit stream into bit planes depending on exposures.

The electronic device may decode the encoded data per bit plane depending on each exposure. According to various embodiments, if a different compression or encoding method for the bit planes applies per bit plane, a different decoding method for the bit planes may apply per bit plane.

In operation 2805, the electronic device may decode first bit planes corresponding to a first exposure of the received bit stream. In operation 2807, the electronic device may decode second bit planes corresponding to a second exposure of the received bit stream.

In operation 2809, the electronic device may generate a first pixel set corresponding to the first exposure from the decoded first bit planes. In operation 2811, the electronic device may generate a second pixel set corresponding to the second exposure from the decoded second bit planes.

In operation 2813, the electronic device may reconstruct the raw image data (e.g., HDR image data) by merging the first pixel set and the second pixel set.

According to various embodiments, at least one of the operations shown in FIG. 28 may be omitted, and at least one other operation may be added between the operations. Further, the operations shown in FIG. 28 may be processed in the order shown or the order of at least one operation and other operation may be varied. Further, the operations shown in FIG. 28 may be performed in the electronic device or server. Such an implementation may be made that at least one operation of the operations shown in FIG. 28 is performed in the electronic device while the other operations are performed in a server.

Figure 29:
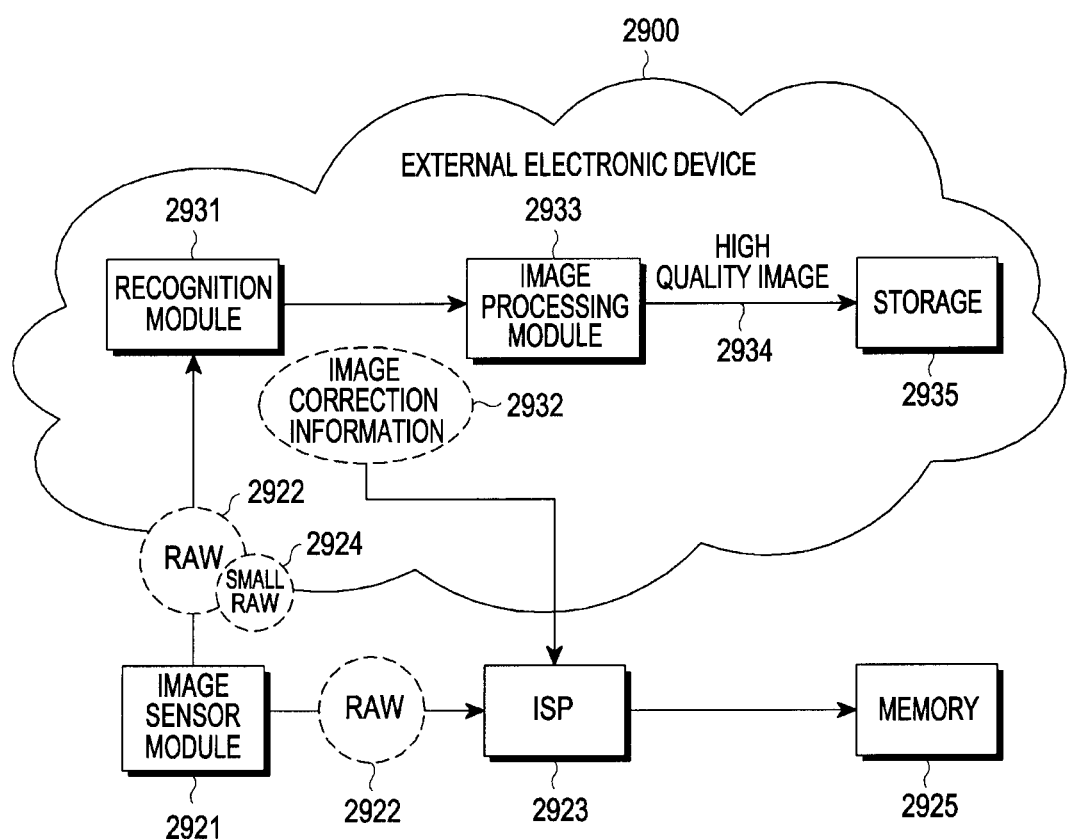
FIG. 29 is a view illustrating a detailed structure of an electronic device and an external electronic device 300 according to an embodiment.

FIG. 29 is a concept view illustrating operations of an electronic device and an external electronic device according to various embodiments.

An electronic device 2601 may include an image sensor module 2921 (e.g., the image sensor module 110 or 2810), an ISP 2923 (e.g., the processor 120 or the ISP 2531), and a memory 2925. An external electronic device 2900 (e.g., the electronic device 2602 or 2604 or server 2608 of FIG. 26) may include a recognition module 2931, an image processing module 2933, and storage 2935. The recognition module 2931 may be a logic module and may be implemented as a processor of the external electronic device 2900. The image processing module 2933 may also be implemented as a processor of the external electronic device 2900. For example, the processor of the external electronic device 2900 may perform both recognition and image processing. Although not shown, the electronic device 2601 may include a communication module (e.g., the interface 2677 or communication module 2690) capable of transmitting and receiving data with the external electronic device 2900. The external electronic device 2900 may include a communication module capable of communicating data with the electronic device 2601.

The image sensor module 2921 (e.g., the control circuit 112 or 2512) may obtain an image for an external object and generate a raw image 2922 corresponding to the image. The image sensor module 2921 may deliver the raw image 2922 to the ISP 2923. According to various embodiments, the image sensor module 2921 may generate a small raw image 2924 and send the small raw image to the external electronic device 2900 through the communication module.

According to various embodiments, the small raw image 2924 means a raw image smaller in data size than the raw image 2922 and should not be interpreted as limited to an image of a specific format or generated by a particular method. For example, the small raw image 2924 may be generated by reducing the volume of the raw image 2922 and be also referred to as a lightweight image. For example, the electronic device 2601 may generate the small raw image 2924 from the raw image 2922 using various downscaling or down-sampling schemes. The electronic device 2601 may generate the small raw image 2924 smaller in data size than the raw image 2922 by performing at least one of, e.g., adjusting the resolution of the raw image 2922, selecting at least some of multiple frequency bands, or selecting at least one of a plurality of bit plane levels. The electronic device 2601 may generate the small raw image 2924 by extracting a low-frequency band from the raw image 2922. The electronic device 2601 may also generate the small raw image 2924 by selecting some of a plurality of bit plane levels of the raw image 2922. The small raw image 2924 may be an image smaller in volume than the raw image 2922 and including at least part of information for the raw image 2922. If the small raw image 2924, instead of the raw image 2922, is transmitted to the external electronic device 2900, less data is transmitted, so that the image may be more rapidly transmitted to the external electronic device 2900.

In another embodiment, the processor of the electronic device 2601, but not the image sensor module 2921, may generate the small raw image 2924 and send the generated small raw image 2924 through the communication module to the external electronic device 2900. The image sensor module 2921 may compress the raw image 2922 for processing at least part of the raw image 2922 or for transmission to the outside (e.g., the processor (e.g., the ISP) or the external electronic device 2900). The image sensor module 2921 may transmit the compressed raw image 2922 to the ISP 2923 or the external electronic device 2900 (e.g., the image processing module 2933). As another embodiment, the ISP 2923 (e.g., the processor 120 or the ISP 2531) may transmit the compressed raw image or small raw image 2924 received from the image sensor module 2921 to the external electronic device 2900. The image sensor module 2921 may compress the raw image 2922 for partial processing and temporarily store the same in the internal memory of the image sensor module 2921. The recognition module 2931 of the external electronic device 2900 may obtain the small raw image 2924 through the communication module and may perform segmentation on at least one image area from the small raw image 2924. The recognition module 2931 may recognize each of at least one image area divided by the segmentation. Image correction information 2932 may be generated which includes at least one of information associated with a plurality of image areas, e.g., information about the coordinates of the image areas, generated from the recognition module 2931, or a result of recognition. The image correction information 2932 may be sent to the electronic device 2601. The ISP 2923 may correct the raw image 2922 using the image correction information 2932, thereby generating a corrected image. The corrected image may have, e.g., a YUB format. The corrected image may be stored in the memory 2925. Or, the corrected image may be compressed as per, e.g., a JPEG scheme, and the compressed image may be stored in the memory 2925.

According to various embodiments, the raw image 2922 provided from the image sensor module 2921 may be sent to the external electronic device 2900 separately from the small raw image 2924. Since the raw image 2922 is large in volume as compared with the small raw image 2924, the small raw image 2924 may be sent to the external electronic device 2900, and the raw image 2922 may then be sent to the external electronic device 2900. For example, while the ISP 2923 corrects the raw image 2922, the raw image 2922 may be sent to the external electronic device 2900. The raw image 2922 may be uploaded onto the external electronic device 2900, as generated by the image sensor module 2921, or a pre-processed image, which is one lens distortion compensated or noise-canceled, may be uploaded. The above-mentioned pre-processing may be performed by the external electronic device 2900. The external electronic device 2900 may perform the pre-processing for the purposes of "Demosaic" processing, image format conversion, or raising image recognition rate. The image processing module 2933 of the external electronic device 2900 may correct the received raw image 2922. The external electronic device 2900 may correct the raw image 2922 using the existing image correction information 2932 generated or using expanded image correction information. The raw image 2922 may have a higher resolution than the small raw image 2924. Thus, the image processing module 2933 of the external electronic device 2900 may obtain expanded image correction information, which is further detailed, from the high-resolution image. The image processing module 2933 may also generate the expanded image correction information using the raw image 2922 along with the existing image correction information generated. The image processing module 2933 may obtain the high-resolution image (high-quality image) 2934 by correcting the raw image 2922 using the expanded image correction information. The high-resolution image 2934 may be stored in the storage unit 2935 of the external electronic device 2900 and may be downloaded to the electronic device 2601.

The electronic device according to various embodiments may be one of various types of electronic devices. The electronic devices may include at least one of, e.g., a portable communication device (e.g., a smartphone), a computer device, a portable multimedia device, a portable medical device, a camera, a wearable device, or a home appliance. According to an embodiment of the disclosure, the electronic devices are not limited to those described above.

As used herein, the term "module" includes a unit configured in hardware, software, or firmware and may interchangeably be used with other terms, e.g., "logic," "logic block," "part," or "circuit." A module may be a single integral part or a minimum unit or part for performing one or more functions. For example, the module may be configured in an application-specific integrated circuit (ASIC).

Various embodiments as set forth herein may be implemented as software (e.g., the program 2640) containing commands that are stored in a machine (e.g., computer)-readable storage medium (e.g., an internal memory 2636) or an external memory 2638. The machine may be a device that may invoke a command stored in the storage medium and may be operated as per the invoked command. The machine may include an electronic device (e.g., the electronic device 2601) according to embodiments disclosed herein. When the command is executed by a processor (e.g., the processor 2620), the processor may perform a function corresponding to the command on its own or using other components under the control of the processor. The command may contain a code that is generated or executed by a compiler or an interpreter. The machine-readable storage medium may be provided in the form of a non-transitory storage medium. Here, the term "non-transitory" simply means that the storage medium does not include a signal and is tangible, but this term does not differentiate between where data is semipermanently stored in the storage medium and where data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)) or online through an application store (e.g., Playstore™). When distributed online, at least part of the computer program product may be temporarily generated or at least temporarily stored in a storage medium, such as the manufacturer's server, a server of the application store, or a relay server.

According to various embodiments, each component (e.g., a module or program) may be configured of a single or multiple entities, and the various embodiments may exclude some of the above-described sub components or add other sub components. Alternatively or additionally, some components (e.g., modules or programs) may be integrated into a single entity that may then perform the respective (pre-integration) functions of the components in the same or similar manner. According to various embodiments, operations performed by modules, programs, or other components may be carried out sequentially, in parallel, repeatedly, or heuristically, or at least some operations may be executed in a different order or omitted, or other operations may be added.

The computer-readable storage medium may include a hardware device, such as hard discs, floppy discs, and magnetic tapes (e.g., a magnetic tape), optical media such as compact disc read only memories (ROMs) (CD-ROMs) and digital versatile discs (DVDs), magneto-optical media such as floptical disks, ROMs, random access memories (RAMs), flash memories, and/or the like. Examples of the program instructions may include not only machine language codes but also high-level language codes which are executable by various computing means using an interpreter. The aforementioned hardware devices may be configured to operate as one or more software modules to carry out exemplary embodiments of the disclosure, and vice versa.

Modules or programming modules in accordance with various embodiments of the disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s).

According to various embodiments, there may be provided a storage medium storing instructions which, when executed by at least one processor, enable the at least one processor to perform at least one operation which, in a method of transmitting high dynamic range image data, comprises obtaining raw image data from an image sensor, generating a plurality of first bit planes configured based on a bit position of each pixel value with at least some of a plurality of pixels constituting a first pixel set corresponding to a first exposure for the plurality of pixels corresponding to at least part of the raw image data obtained by the image sensor, generating a plurality of second bit planes configured based on a bit position of each pixel value with at least some of a plurality of pixels constituting a second pixel set corresponding to a second exposure different from the first exposure, encoding each of the plurality of first bit planes and the plurality of second bit planes, and transmitting a bit stream including the encoded first bit planes and second bit planes to a processor.

The embodiments herein are provided merely for better understanding of the present invention, and the present invention should not be limited thereto or thereby. It should be appreciated by one of ordinary skill in the art that various changes in form or detail may be made to the embodiments without departing from the scope of the present disclosure defined by the following claims.

What is claimed is:

1. An electronic device, comprising:
a processor;
an image sensor configured to generate a first sensor pixel set and a second sensor pixel set, wherein pixels in the first sensor pixel set are interspersed with pixels in the second sensor pixel set, such that one or more pixels in the first sensor pixel set are each immediately adjacent to a corresponding pixel in the second sensor pixel set; and a control circuit electrically connected with the image sensor, wherein the control circuit is configured to:
obtain raw image data using the image sensor having different exposure settings for the first sensor pixel set and the second sensor pixel set,
split the raw image data into first channel data corresponding to a first color and second channel data corresponding to a second color,
generate first channel compression data compressed so that at least portions of data obtained via the first sensor pixel set are adjacent to each other and at least portions of data obtained via the second sensor pixel set are adjacent to each other based on the first channel data,
generate second channel compression data compressed so that at least portions of data obtained via the first sensor pixel set are adjacent to each other and at least portions of data obtained via the second sensor pixel set are adjacent to each other based on the second channel data, and
transmit the compressed first channel compression data and the compressed second channel compression data to the processor.

2. The electronic device of claim 1, wherein the control circuit is configured to generate a plurality of first bit planes configured with at least some of a plurality of pixels constituting the first sensor pixel set, based on a bit position of each pixel value, generate a plurality of second bit planes configured with at least some of a plurality of pixels constituting the second sensor pixel set, based on a bit position of each pixel value, and generate the first channel compression data or the second channel compression data by performing compression per first bit plane or per second bit plane.

3. The electronic device of claim 2, wherein the control circuit is configured to multiply a pixel value of each of the pixels constituting the second sensor pixel set by a preset value based on a ratio of exposure of the first sensor pixel set to exposure of the second sensor pixel set and generate the second bit planes with at least some of the plurality of pixels constituting the second sensor pixel set.

4. The electronic device of claim 3, wherein the control circuit is configured to select at least one bit plane to perform encoding based on compression efficiency among the first bit planes and the second bit planes.

5. The electronic device of claim 4, wherein the control circuit is configured to select the at least one bit plane based on at least one of a pixel value of each of the plurality of pixels, numbers of the first bit planes, numbers of the second bit planes, and flat area information for the raw image data.

6. The electronic device of claim 1, wherein each pixel of the first sensor pixel set and each pixel of the second sensor pixel set are arranged according to a preset pattern on the raw image data.

7. The electronic device of claim 2, wherein the control circuit is configured to convert at least a portion of the raw image data obtained from the image sensor into a gray code and generate the first bit planes or the second bit planes for the raw image data converted into the gray code.

8. The electronic device of claim 1, wherein the control circuit is configured to generate the first channel compression data or the second channel compression data based on a run-length scheme.

9. The electronic device of claim 2, wherein the control circuit is configured to divide the raw image data into a plurality of partitions, each of the partitions including a plurality of pixels, and to generate the first bit planes or the second bit planes using data corresponding to the plurality of pixels included in each partition.

10. The electronic device of claim 9, wherein the control circuit is configured to generate a bit stream including an image header data field including at least one piece of information related to the raw image data, a partition header data field including at least one piece of information related to the plurality of partitions, or a compression data field including data resultant from encoding the first bit planes or the second bit planes, and wherein the control circuit is configured to transmit the bit stream to the processor to enable the processor to decode the encoded data using, at least, the image header data field including the at least one piece of information related to the raw image data, the partition header data field including the at least one piece of information related to the partition, or the compression data field including the data resultant from decoding the first bit planes or the second bit planes.

11. A method for transmitting high dynamic range (HDR) image data, the method comprising:
obtaining, by an image sensor configured to generate a first sensor pixel set and a second sensor pixel set, raw image data using the image sensor having different exposure settings for the first sensor pixel set and the second sensor pixel set, wherein pixels in the first sensor pixel set are interspersed with pixels in the second sensor pixel set, such that one or more pixels in the first sensor pixel set are each immediately adjacent to a corresponding pixel in the second sensor pixel set;
splitting the raw image data into first channel data corresponding to a first color and second channel data corresponding to a second color;
generating first channel compression data by performing compression so that at least portions of data obtained via the first sensor pixel set are adjacent to each other and at least portions of data obtained via the second sensor pixel set are adjacent to each other based on the first channel data;
generating second channel compression data by performing compression so that at least portions of data obtained via the first sensor pixel set are adjacent to each other and at least portions of data obtained via the second sensor pixel set are adjacent to each other based on the second channel data; and
transmitting the compressed first channel compression data and the compressed second channel compression data to a processor.

12. The method of claim 11, further comprising:
generating a plurality of first bit planes configured with at least some of a plurality of pixels constituting the first sensor pixel set, based on a bit position of each pixel value;
generating a plurality of second bit planes configured with at least some of a plurality of pixels constituting the second sensor pixel set, based on a bit position of each pixel value; and
generating the first channel compression data or the second channel compression data by performing compression per first bit plane or per second bit plane.

13. The method of claim 12, further comprising:
multiplying a pixel value of each of the pixels constituting the second sensor pixel set by a preset value based on a ratio of exposure of the first sensor pixel set to exposure of the second sensor pixel set; and generating the second bit planes with at least some of the plurality of pixels constituting the second sensor pixel set.

14. The method of claim 13, further comprising selecting at least one bit plane to perform encoding based on compression efficiency among the first bit planes and the second bit planes.

15. The method of claim 14, further comprising selecting the at least one bit plane based on at least one of a pixel value of each of the plurality of pixels, numbers of the first bit planes, numbers of the second bit planes, and flat area information for the raw image data.

16. The method of claim 11, wherein each pixel of the first sensor pixel set and each pixel of the second sensor pixel set are arranged according to a preset pattern on the raw image data.

17. The method of claim 12, further comprising converting at least a portion of the raw image data obtained from the image sensor into a gray code and generate the first bit planes or the second bit planes for the raw image data converted into the gray code.

18. The method of claim 11, further comprising generating the first channel compression data or the second channel compression data based on a run-length scheme.

19. The method of claim 12, further comprising dividing the raw image data into a plurality of partitions, each of the partitions including a plurality of pixels, and to generate the first bit planes or the second bit planes using data corresponding to the plurality of pixels included in each partition.

20. The method of claim 19, further comprising:

generating a bit stream including an image header data field including at least one piece of information related to the raw image data, a partition header data field including at least one piece of information related to the plurality of partitions, or a compression data field including data resultant from encoding the first bit planes or the second bit planes; and transmitting the bit stream to the processor to enable the processor to decode the encoded data using, at least, the image header data field including the at least one piece of information related to the raw image data, the partition header data field including the at least one piece of information related to the partition, or the compression data field including the data resultant from decoding the first bit planes or the second bit planes.

* * * * *